(12) United States Patent
Kolb

(10) Patent No.: US 7,868,820 B2
(45) Date of Patent: Jan. 11, 2011

(54) IONOSPHERE MODELING APPARATUS AND METHODS

(75) Inventor: Peter F. Kolb, Grassau (DE)

(73) Assignee: Trimble Navigation Limited, Sunnyvale, CA (US)

( * ) Notice: Subject to any disclaimer, the term of this patent is extended or adjusted under 35 U.S.C. 154(b) by 82 days.

(21) Appl. No.: 11/988,763

(22) PCT Filed: Sep. 5, 2006

(86) PCT No.: PCT/US2006/034433

§ 371 (c)(1),
(2), (4) Date: Jan. 14, 2008

(87) PCT Pub. No.: WO2007/032947

PCT Pub. Date: Mar. 22, 2007

(65) Prior Publication Data

US 2009/0224969 A1    Sep. 10, 2009

Related U.S. Application Data

(60) Provisional application No. 60/715,752, filed on Sep. 9, 2005.

(51) Int. Cl.
*G01S 19/44* (2010.01)
*G01S 19/43* (2010.01)
(52) U.S. Cl. .............. 342/357.27; 342/357.26
(58) Field of Classification Search ........... 342/357.02, 342/357.04, 357.06, 357.12; 701/207, 213
See application file for complete search history.

(56) References Cited

U.S. PATENT DOCUMENTS 5,477,458 A    12/1995   Loomis

| | | | |
|---|---|---|---|
| 5,899,957 A | 5/1999 | Loomis | |
| 6,356,232 B1* | 3/2002 | Rocken et al. | 342/357.02 |
| 6,799,116 B2 | 9/2004 | Robbins | |
| 2005/0101248 A1 | 5/2005 | Vollath | |

OTHER PUBLICATIONS

S.M. Radicella et al., *A Flexible 3D Ionospheric Model for Satellite Navigation Applications*, Proceedings GNSS 2003, Japan.

F. Azpilicueta et al., *Optimized NeQuick Ionospheric Model for Point Positioning*, Proceedings GNSS 2003, Japan.

O.L. Colombo et al., *Resolving Carrier-Phase Ambiguities on the Fly, at more than 100 km from nearest Reference Site, with the Help of Ionospheric Tomography*, Ion GPS 1999, Nashville.

M. Hernandez-Pajares et al., *New Approaches in Global Ionospheric Determination using Ground GPS Data*, Journal of Atmospheric and Solar-Terrestrial Physics (61) 1999, 1237.

M. Hernandez-Pajares et al., *Application of Ionospheric Tomography to Real-Time GPS Carrier-Phase Ambiguities Resolution, at Scales of 400-1000 km and with High Geomagnetic Activity*, Geophysical Research Letters, 13 (27) 2000, 2009.

(Continued)

*Primary Examiner*—Dao L Phan
(74) *Attorney, Agent, or Firm*—Bruce D. Riter

(57) ABSTRACT

Methods and apparatus which characterize the ionospheric error across a network of GNSS reference stations are presented. The method relies on dual-frequency phase measurements in a geometry-free linear combination. The data are filtered for ambiguities and the characteristic parameters of the ionosphere. In combination with filter results from other combinations of phase measurements (ionosphere free combination), the physically-based model provides rapid and reliable ambiguity resolution.

22 Claims, 18 Drawing Sheets

OTHER PUBLICATIONS

M. Hernandez-Pajares et al., *Precise Ionospheric Determination and its Application to Real-Time GPS Ambiguity Resolution*, Ion GPS 1999, Nashville.

Y. Liu et al., *Development and Evaluation of a New 3-D Ionospheric Modeling Method*, Navigation 4 (51) 2004, 311.

A.J. Hansen et al., *Ionospheric Correction Using Tomography*, Ion GPS 1997, Kansas City.

D. Odijk, *Improving Ambiguity Resolution by Applying Ionosphere Corrections from a Permanent GPS Array*, Earth Planets Space 10 (52) 2000, 675.

D. Odijk, *Weighting Ionospheric Corrections to Improve Fast GPS Positioning Over Medium Distances*, Ion GPS 2000, Salt Lake City.

D. Odijk, Fast Precise GPS Positioning in the Presence of Ionospheric Delays, Ph.D thesis, Dept. of Mathematical Geodesy and Positioning, Delft University of Technology, Delft University Press, The Netherlands, 2002.

T. Richert et al., *Ionospheric Modeling*, GPS World, Jun. 2005, 35.

S. Bassiri et al., *Modeling the Global Positioning System Signal Propagation Through the Ionosphere*, TDA Progress Report 42-110, Aug. 1992.

D. Bilitza, *International Reference Ionosphere 2000*, Radio Science 2 (36) 2001, 261-275.

* cited by examiner

IONOSPHERE MODELING APPARATUS AND METHODS

CROSS REFERENCE TO RELATED APPLICATIONS

Benefit is claimed of the filing date of Provisional U.S. Patent Application 60/715,752 filed 9 Sep. 2005 and of International Application PCT/US2006/03433 filed 5 Sep. 2006.

TECHNICAL FIELD

The present invention relates to the field of Global Navigation Satellite Systems. More particularly, the present invention relates to ionospheric modeling and ambiguity resolution of GNSS signals for two or more carriers.

BACKGROUND ART

Global Navigation Satellite Systems (GNSS) include the Global Positioning System (GPS), the Glonass system, and the proposed Galileo system. Each GPS satellite transmits continuously using two radio frequencies in the L-band, referred to as L1 and L2, at respective frequencies of 1575.41 MHz and 1227.60 MHz. Two signals are transmitted on L1, one for civil users and the other for users authorized by the Unites States Department of Defense (DoD). One signal is transmitted on L2, intended only for DoD-authorized users. Each GPS signal has a carrier at the L1 and L2 frequency, a pseudo-random number (PRN) code, and satellite navigation data. Two different PRN codes are transmitted by each satellite: a coarse acquisition (C/A) code and a precision (P/Y) code which is encrypted for DoD-authorized users. Each C/A code is a unique sequence of 1023 bits, which is repeated each millisecond.

FIG. 1 schematically illustrates a typical prior-art scenario to determine the position of a mobile receiver (rover). Rover 100 receives GPS signals from any number of satellites in view, such as SV1, SV2, and SVM, shown respectively at 110, 120 and 130. The signals pass through the earth's ionosphere 140 and through the earth's troposphere 150. Each signal has two frequencies, L1 and L2. Receiver 100 determines from the signals respective pseudo-ranges, PR1, PR2, . . . , PRM, to each of the satellites. Pseudo-range determinations are distorted by variations in the signal paths which result from passage of the signals through the ionosphere and the troposphere, and from multipath effects, as indicated schematically at 160.

Pseudo-range can be determined using the C/A code with an error of about one meter, a civil receiver not using the military-only P/Y code determines rover position with an error in the range of meters. However, the phases of the L1 and L2 carriers can be measured with an accuracy of 0.01-0.05 cycles (corresponding to pseudo-range errors of 2 mm to 1 cm), allowing relative position of the rover to be estimated with errors in the range of millimeters to centimeters. Accurately measuring the phase of the L1 and L2 carriers requires a good knowledge of the effect of the ionosphere and the troposphere for all observation times.

The largest error in carrier-phase positioning solutions is introduced by the ionosphere, a layer of charged gases surrounding the earth. When the signals radiated from the satellites penetrate this medium on their way to the ground-based receivers, they experience delays in their signal travel times and shifts in their carrier phase (phase advance). Fast and reliable positioning requires a good model of the spatio-temporal correlations of the ionosphere to correct for these non-geometric influences.

Network solutions using multiple reference stations of known location allow correction terms to be extracted from the signal measurements; those corrections can be interpolated to all locations within the network. See for example U.S. Pat. No. 5,477,458 "Network for Carrier Phase Differential GPS Corrections" and U.S. Pat. No. 5,899,957 "Carrier Phase Differential GPS Corrections Network."

FIG. 2 illustrates a network technique in which N ground-based reference stations of known location 211, 212, 213, 21N receive GNSS signals from M satellites 221, 222, . . . , 22M. The GNSS signals are perturbed by the ionosphere 230, by the troposphere and by multipath effects. The coordinates of each reference station are known precisely. These stations use GNSS signal measurements of the current epoch and their known location to calculate a residual error with respect to each satellite m. In this way each reference station n obtains a pseudorange correction ($PRC(t; t_0; n; m)$) for each observed satellite m. These corrections are transmitted to a central station 240 which lies within or outside of the network. Central station 240 calculates pseudorange corrections for a location close to the rover's last position and sends these to the rover. The rover can use the pseudorange corrections to improve its current position estimate.

In this network technique, all of the errors used in the position estimates are lumped together as a residual, disregarding their individual characters, such as short range correlations in multipath and long range correlations in the ionosphere. Calculating pseudorange corrections is done by interpolating residual errors of the reference stations.

There have been attempts to extract two- or even three-dimensional information on the ionosphere from GPS measurements. See S. M. RADICELLA et al., *A Flexible 3D Ionospheric Model for Satellite Navigation Applications*, PROCEEDINGS GNSS 2003, Japan; and F. AZPILICUETA et al., *Optimized NeQuick Ionospheric Model for Point Positioning*, PROCEEDINGS GNSS 2003, Japan. In the Nequick 3D model, the vertical structure of the ionosphere is parameterized in terms of profiling functions that capture the main characteristics of the ionospheric layer.

Also known are 'tomographic' models which break the ionosphere into a 3-dimensional grid that surrounds the earth. See O. L. COLOMBO et al., *Resolving Carrier-Phase Ambiguities on the Fly, at more than 100 km from nearest Reference Site, with the Help of Ionospheric Tomography*, ION GPS 1999, Nashville; M. HERNANDEZ-PAJARES et al., *New Approaches in Global Ionospheric Determination using Ground GPS Data*, JOURNAL OF ATMOSPHERIC AND SOLAR-TERRESTRIAL PHYSICS (61) 1999, 1237; M. HERNANDEZ-PAJARES et al., *Application of Ionospheric Tomography to Real-Time GPS Carrier-Phase Ambiguities Resolution, at Scales of 400-1000 km and with High Geomagnetic Activity*, GEOPHYSICAL RESEARCH LETTERS, 13 (27) 2000, 2009; M. HERNANDEZ-PAJARES et al., *Precise Ionospheric Determination and its Application to Real-Time GPS Ambiguity Resolution*, ION GPS 1999, Nashville. Due to limited data and computing power, such an ionospheric grid must remain rather coarse.

Other modeling efforts combine the ionospheric measurements across the hemisphere visible to a satellite and apply a spherical expansion for the entire hemisphere. See Y. LIU et al., *Development and Evaluation of a New 3-D Ionospheric Modeling Method*, NAVIGATION 4 (51) 2004, 311. In this work, the altitude dependence is modeled by a linear combination of orthogonal functions. The authors of this approach hope to extract a correlation in the ionosphere across distances of thousands of kilometers.

Without assuming any correlation between the stations, Hansen et al. trace the electron content along the signal path through the ionosphere. See A. J. HANSEN et al., *Ionospheric Correction Using Tomography*, ION GPS 1997, Kansas City; and D. BILITZA, *International Reference Ionosphere 2000*, RADIO SCIENCE 2 (36) 2001, 261.

There have also been studies on the interpolation of the ionospheric residual to the approximate location of a rover within a network of known stations. See D. ODIJK, *Improving Ambiguity Resolution by Applying Ionosphere Corrections from a Permanent GPS Array*, EARTH PLANETS SPACE 10 (52) 2000, 675; D. ODIJK, *Weighting Ionospheric Corrections to Improve Fast GPS Positioning Over Medium Distances*, ION GPS 2000, Salt Lake City; and D. ODIJK, *Fast Precise GPS Positioning in the Presence of Ionospheric Delays*, Ph.D thesis, Dept. of Mathematical Geodesy and Positioning, Delft University of Technology, Delft University Press, The Netherlands, 2002. These models typically introduce one ionospheric parameter for each station-satellite combination, which is estimated for each station independently. These independent observations are interpolated to the approximated rover location to offer a correction value to the user.

Techniques have also been proposed for ionospheric modeling and integer ambiguity resolution with the larger number of frequencies that will be supplied by modernized GPS and GALILEO. See T. RICHERT et al., *Ionospheric Modeling*, GPS WORLD, June 2005, 35.

DISCLOSURE OF INVENTION

Improved methods and apparatus for processing GNSS signals are provided by embodiments in accordance with the present invention. The need is addressed for carrier-phase ambiguity resolution in current and future GNSS systems providing users with two or more frequencies, e.g. GPS, GLONASS and the future GALILEO. Computationally efficient techniques are employed on a realistic physical model for obtaining good approximations of the carrier phase ambiguities.

Embodiments in accordance with the invention as compared to existing ionospheric models and carrier-phase ambiguity resolution techniques offer high computational efficiency for the filter components (float solution) and the ability to obtain a better knowledge of the error properties of individual measurements and measurement combinations. This efficiency offers one or more benefits: increased position-fixing performance and reliability; faster fixing of carrier-phase ambiguities across a network so that corrections can be provided sooner to a rover in the field; interpolation of ionospheric correction values to any location within the network, allowing even rovers with single-frequency signal-processing capability to correct for ionospheric influences; and insight into the current physical state of the ionosphere and ionospheric dynamics.

Prior-art network methods discussed above lump together residual errors, disregarding their individual characteristics, such as short-range correlations in multipath and long-range correlations in the ionosphere. In contrast, embodiments in accordance with the invention take the interpolation to a physical level in which the ionosphere is measured in terms of its "total electron content" (TEC). Alternatively, the physical effect that the ionosphere produces on the phase measurement of the GNSS signals can be formulated directly in terms of the advance of the phase crests (measured for example in units of centimeters). The conversion from one formulation to another is a simple linear relation.

The prior-art Nequick 3D model discussed above attempts to trace the large scale ionospheric variation across the globe, but does not deliver the detailed structure to obtain differential corrections across local networks. The same can be said for prior-art "tomographic" models which break the ionosphere into a 3-dimensional grid surrounding the earth.

In contrast to such modeling efforts which attempt to extract correlations in the ionosphere over distances of thousands of kilometers, embodiments in accordance with the invention employ correlations on distances of tens to hundreds of kilometers, while treating information on distances on thousands of kilometers as largely independent of each other.

Studies on interpolation of the ionospheric residual to the approximate location of a rover within a network of known stations typically introduce one ionospheric parameter for each station-satellite combination, which is estimated for every station independently. These independent observations are interpolated to the approximated rover location to offer a correction value to the user.

In contrast, embodiments in accordance with the invention exploit correlations in the ionosphere at the filtering level. A set of parameters is introduced to characterize the ionosphere to a sufficient degree. These parameters are elements of a state vector which is estimated from the data using a Kalman filtering algorithm. For network situations with more than four stations, this leads to a smaller number of parameters to be estimated than in prior art approaches and therefore to more rapid convergence, both for the ionosphere's parameters as well for as the carrier-phase integer ambiguities. As a result, error estimates are improved. This leads to higher reliability of the extracted integer ambiguity being the correct integer number of wavelengths from satellite to receiver.

BRIEF DESCRIPTION OF DRAWINGS

These and other aspects and features of the present invention will be more readily understood from the embodiments described below with reference to the drawings, in which.

MODES FOR CARRYING OUT THE INVENTION

Embodiments in accordance with the invention employ a novel approach to ionospheric modeling together with efficient algorithms that improve on prior-art models. Phase measurements of signals of at least two wavelengths, as acquired by a network of GNSS reference stations, are used in a geometry-free linear combination.

An illustrative embodiment uses the two wavelengths k1 and X2 on the respective frequency bands L1 and L2 of the current NAVSTAR Global Positioning System (GPS). However, principles of the invention can be applied to any GNSS system supplying signals on two or more frequencies, such as the Russian-deployed GLONASS system or the planned Galileo system. The model presented here is also applicable for the signals on three or more frequencies that will be supplied by the modernized GPS system and the Galileo system. For three or more carrier frequencies, a different linear combination of the phase measurements is processed in a filter equivalent to the one presented here which will lead to reduced errors and improve resolution times of ambiguities and ionospheric parameters. See U. Vollath, Ambiguity Estimation of GNSS Signals for Three or More Carriers, United States Published Patent Application US 2005/0101248 A1.

In accordance with embodiments of the invention, ionosphere information gained from processing of GNSS signals received at reference stations of a network is interpolated to any location within the network. Ionosphere corrections broadcast to a rover inside the network can aid the rover in obtaining a corrected navigation solution.

Overview of Fixing Concept

Figure 1:
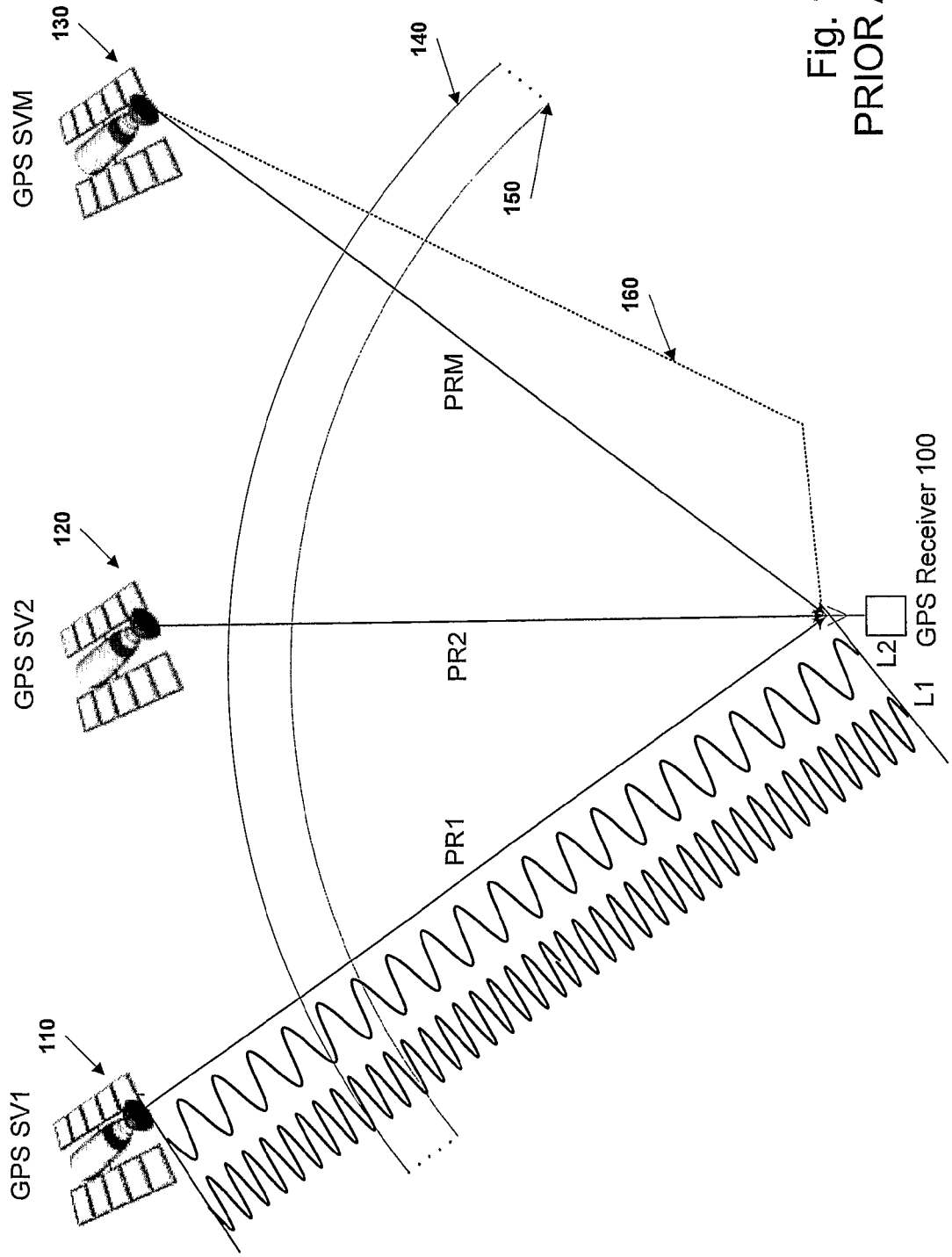
FIG. 1 schematically illustrates a typical prior-art scenario to determine a rover position.
Figure 2:
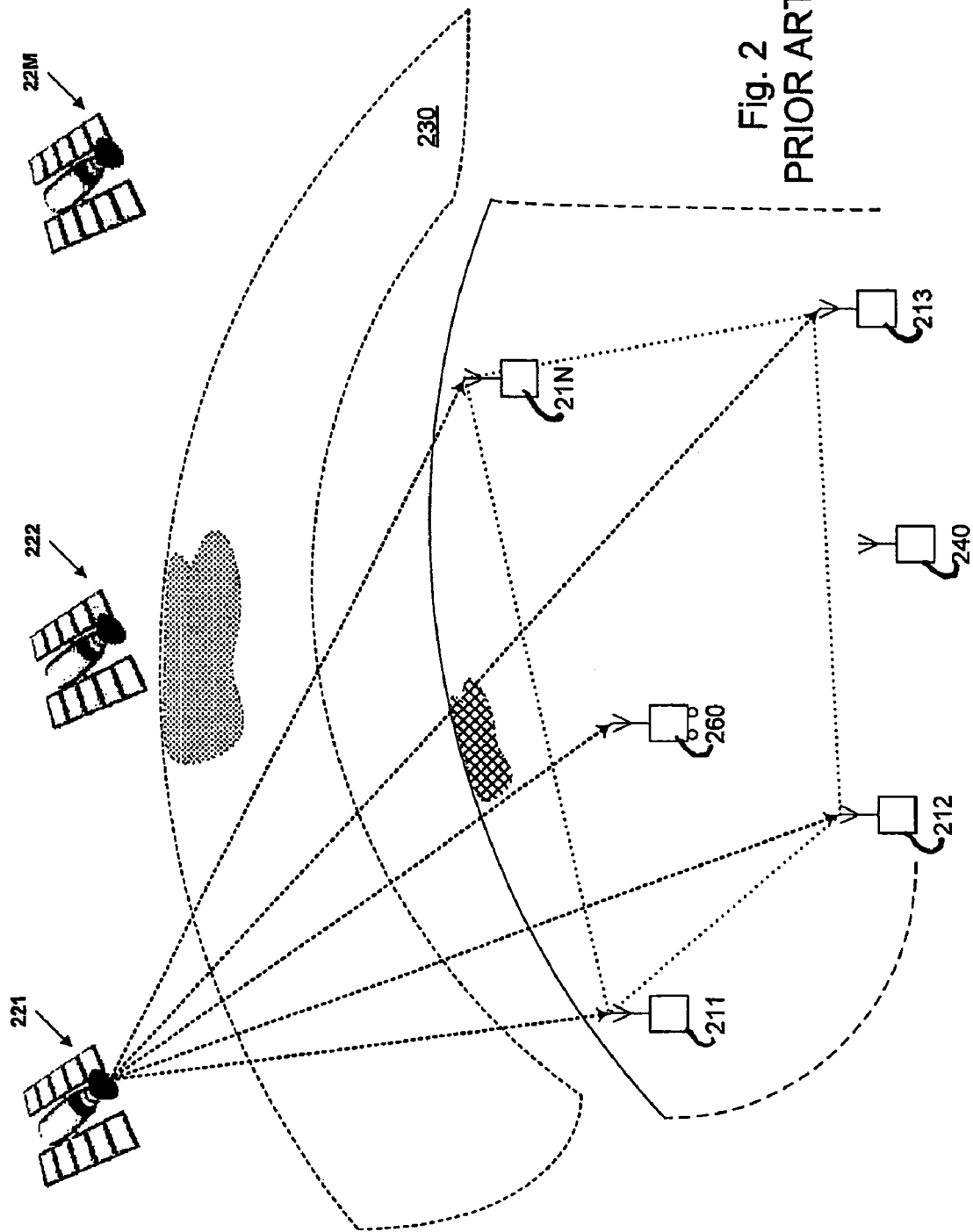
FIG. 2 schematically illustrates a typical prior-art network positioning scenario.
Figure 3:
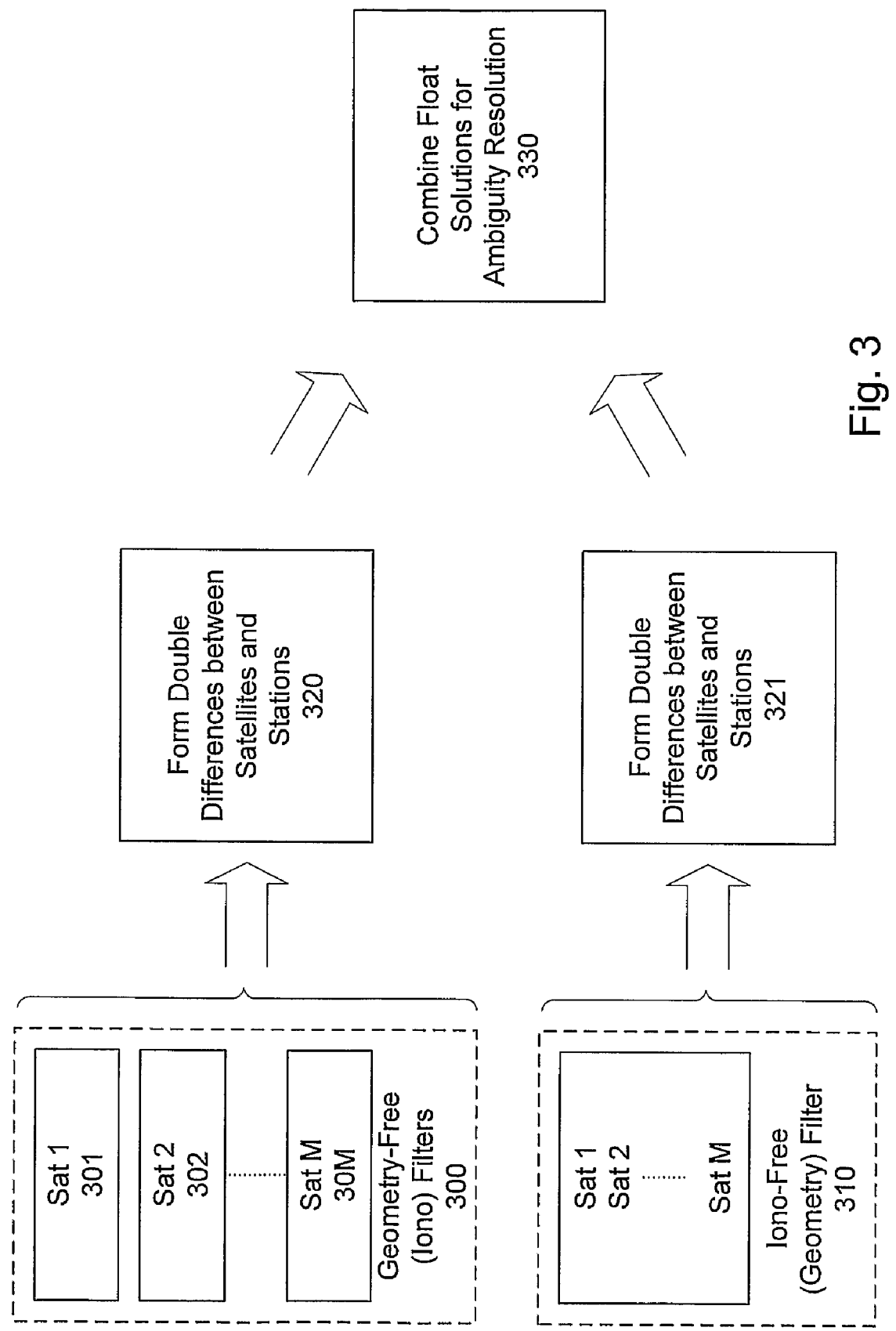
FIG. 3 schematically illustrates a GNSS signal-processing method in accordance with an embodiment of the invention.

As shown schematically in FIG. 3, a set of geometry-free Kalman filters 300 and a complementary ionosphere-free filter 310 are employed to completely resolve ambiguities from the carrier-phase measurements taken at N reference stations. A respective one of the geometry-free (ionosphere) filters 301, 302, . . . , 30M is provided for each observed satellite 1, 2, . . . , M. Each of the geometry-free filters 301, 302, . . . , 30M treats the measurements taken at the reference stations and the state vectors for its satellite independently of those for the other satellites. Processing can be performed with measurements of at least two satellites (M≧2) observed by at least two reference stations (N≧2). Good results have been obtained with at least two satellites continuously tracked by four reference stations, though to assure good geometry it is better to track at least four satellites. In practice it is common to use a network with a larger number of reference stations (e.g., 20 or more reference stations) tracking 6 to 10 satellites over a period of hours. The state estimates of different filters and reference stations are combined to form double differences of the floating ambiguity estimates in 320. In parallel, a single ionosphere-free (geometry) filter 310 treats all station-satellite pairs to deliver orthogonal estimates for the double differences of the ambiguities in 321. Combining the complementary float solutions of 320 and 321 leads to the final integer ambiguities and their validation at 330.

Figure 4:
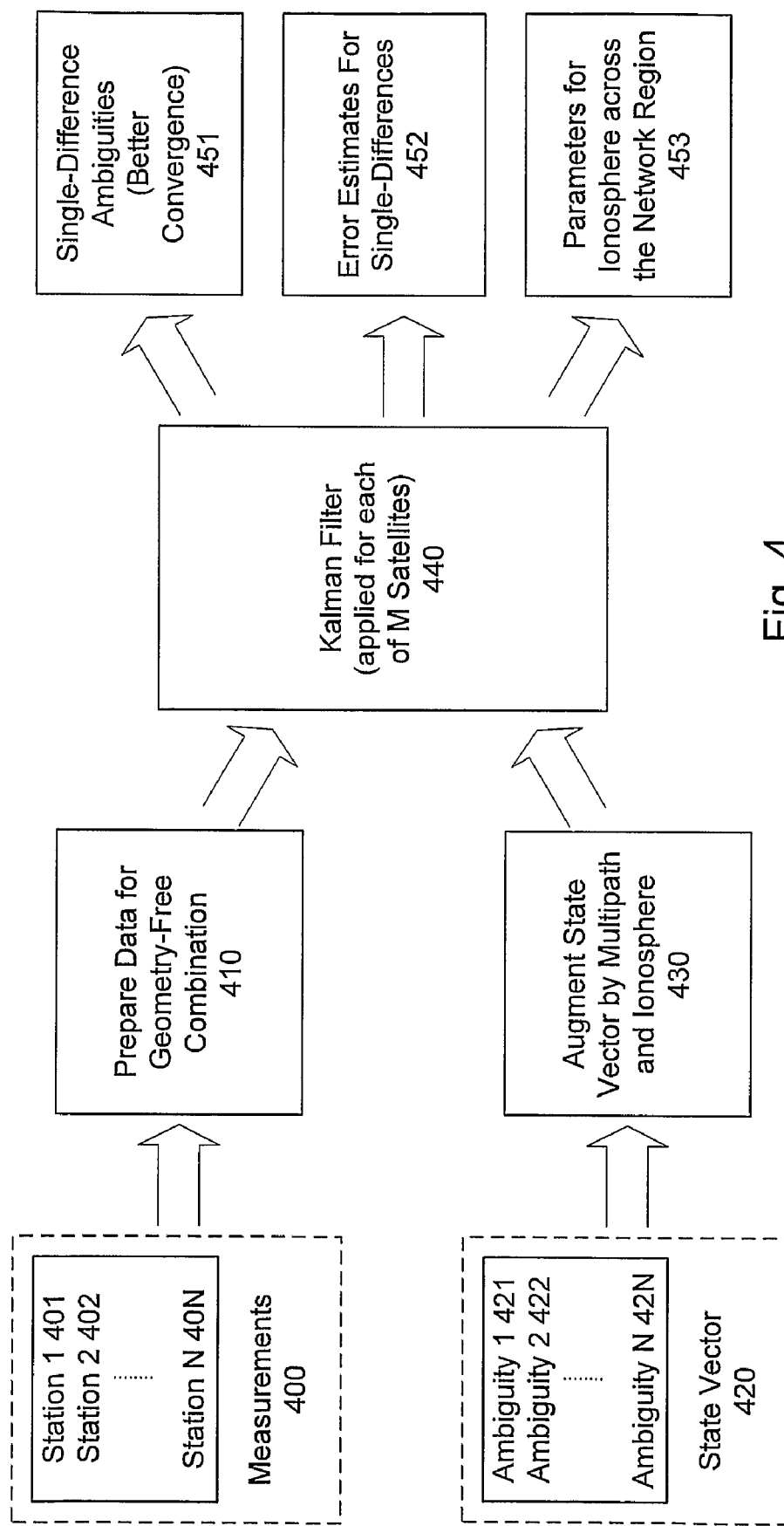
FIG. 4 schematically further illustrates a GNSS signal-processing method in accordance with an embodiment of the invention.

FIG. 4 illustrates the independent treatment in the geometry-free (ionosphere) filters 300 of measurements 401, 402, . . . , 40N taken at each of reference stations 1, 2, . . . , N. For each satellite of the M satellites, the data is prepared and the geometry-free combination of the measurements for the two wavelengths is obtained in 410. For N reference stations there are ideally N measurements per epoch for each of the M satellites. The goal is to deduce, from these N measurements, N ambiguities 421, 422, . . . , 42N as part of the state vector 420. In 430 the state vector is augmented by multipath states (1 per reference station) and by terms to characterize the ionosphere. A Kalman filtering algorithm 440 is then applied for each satellite individually. As the number of states to be estimated is greater than the number of reference stations, measurements acquired over a number of epochs are used to separate the states of state vector 420. The improved modeling of the ionosphere as proposed here leads to better convergence of single difference ambiguities as indicated at 451 together with realistic error estimates as indicated at 452 for the parameters of state vector 420 and parameterization of the ionosphere across the network as indicated at 453.

Data Preparation

The model described here is based on phase measurements on wavelengths $\lambda 1$ and $\lambda 2$ of respective carrier frequencies L1 and L2. The measurements are acquired by a network of N reference stations, each with precisely known coordinates $(x_n, y_n, z_n)$, $n \in \{1, \ldots, N\}$. The stations receive code and phase measurements from M satellites at coordinates $(x^m(t), y^m(t), z^m(t))$, $m \in \{1, \ldots, M(t)\}$. The geometry of the space segment (positions of orbiting satellites as viewed from each reference station) varies continuously, and the number of satellites M visible at each reference station changes with time t. Physical separation of the reference stations is on the order of 10-100 km. The satellites are typically more widely dispersed and therefore their signals received at a given reference station probe largely different sections of the sky. A strong correlation between the ionospheric effects from station to station is therefore assumed, while the ionospheric effects from satellite to satellite are considered independent. Each satellite is (at this stage of processing) treated independently of the others for the entire period during which it is visible to the network. Differences between state estimates among different satellites are built later so that errors common to the satellites can be eliminated.

The true distance $R_n^m$ between station n and satellite m is related to the carrier-phase measurement $_i\phi_n^m$ (where i indicates the carrier-frequency of the observation) by $$R_n^m = \lambda_i(_i\phi_n^m + _iN_n^m) - T_n^m + _iI_n^m - _iMP_n^m + c(\delta t_n - \delta t^m) - \epsilon_n^m. \quad (1.)$$

The term $_iN_n^m$ is the initial (theoretical) number of full wavelengths of the carrier frequency between reference station n and satellite m for a signal traveling in vacuum. The term $T_n^m$ represents a delay introduced by the troposphere, the uncharged layer of the earth's atmosphere. The term $_iI_n^m$ represents a negative delay (an apparent "acceleration") of the wave crests due to the ionosphere. A multipath term $_iMP_n^m$ results from reflections of signals in the surroundings of the receiver and is on the centimeter level. The right-hand side of this relation is greatly disturbed by nuisance parameters, in particular clock offsets between the reference stations $\delta t_n$ and the satellite segment $\delta t^m$ (multiplied by the speed of signal propagation c). The term $\epsilon_n^m$ represents errors not otherwise accounted for in Eq. (1).

Currently the GPS system offers signals at two wavelengths $\lambda_1 = 0.19029$ m and $\lambda_2 = 0.24421$ m. The tropospheric delay $T_n^m$, the clock offsets $\delta t_n$, $\delta t^m$, and the true range between station and satellite $R_n^m$ are all independent of signal frequency. This fact can be exploited by taking the difference of the phase measurements for the station-satellite pairs to eliminate the frequency-independent parameters. Furthermore, there is a known physical relationship between the ionospheric phase advance for different wavelengths, which relates the effect experienced for waves of different frequencies $_1I_n^m/_2I_n^m = f_2^2/f_1^2 = \lambda_1^2/\lambda_2^2$, an approximation that is fully sufficient to our purposes, see S. BASSIRI et al., *Modeling the Global Positioning System Signal Propagation Through the Ionosphere*, TDA PROGRESS REPORT 42-110, August 1992. Taking advantage of this relation and building the difference of Eq. (1) we obtain the fundamental "geometry-free" (ionospheric) observation equation $$\phi_n^m = -N_n^m + MP_n^m + I_n^m + \epsilon. \quad (2.)$$

Here we have abbreviated $$\phi_n^m = \frac{\lambda_1^2}{\lambda_2^2 - \lambda_1^2}(_1\phi_n^m \lambda_1 - _2\phi_n^m \lambda_2), \quad (3.)$$

$$N_n^m = \frac{\lambda_1^2}{\lambda_2^2 - \lambda_1^2}(_1N_n^m \lambda_1 - _2N_n^m \lambda_2), \quad (4.)$$

$$MP_n^m = \frac{\lambda_1^2}{\lambda_2^2 - \lambda_1^2}(_1MP_n^m - _2MP_n^m), \quad (5.)$$

and $$I_n^m = {_1I_n^m}, \quad (6.)$$

where the prefixed index relates to the corresponding wavelength 1 or 2. Note that due to the operation Eq. (4), $N_n^m$ is no longer integer and carries units of distance (meters).

The aim of processing the measurements $\phi_n^m$ is to rapidly determine the parameters $N_n^m$, $MP_n^m$ and $I_n^m$ within a consistent framework and consistent error estimates. Relevant for the determination of the integer ambiguities on wavelengths $\lambda_1$ and $\lambda_2$ of respective carrier frequencies L1 and L2 are the double differences of integer ambiguities where differences are taken once between reference stations and once between satellites.

Here $I_n^m$ is not assumed to be independent among the stations but a correlation across the network for each given satellite is assumed.

Modeling the Ionosphere

Ultraviolet radiation and a constant stream of particles from the sun ionize the gases of the earth's atmosphere, to produce a layer of charged gases, the ionosphere. A charged gas is a dispersive medium for electromagnetic waves such as GNSS signals. To a very good approximation, the refractive index n for an electromagnetic wave of frequency f (in units of 1/second) is given as $$n \approx 1 - 40.3 \frac{n_e}{f^2}, \quad (7.)$$

Where $n_e$ is the free electron density in the gas in units of $1/m^3$. The (approximate) constant 40.3 arises from a combination of natural constants such as electron mass, electron charge, etc. The result is an advanced arrival of the phase crests that penetrate the charged gas compared to signals traveling in vacuum with refraction index $n_{vac} = 1$ of $$\Delta \tau = -\frac{1}{c} \frac{40.3}{f^2} \int_r^s n_e dl, \quad (8.)$$

where the integral runs over the pathway that connects reference-station receiver r and satellite s. The integral expression is commonly referred to as the "Total Electron Content" (TEC). The negative sign is the reason for use of the terminology "phase advance." Expressed in units of meters (after multiplication by the speed of light) the connection between ionospheric advance and total electron content is $$I = 40.3 \frac{TEC}{f^2}. \quad (9.)$$

Figure 5:
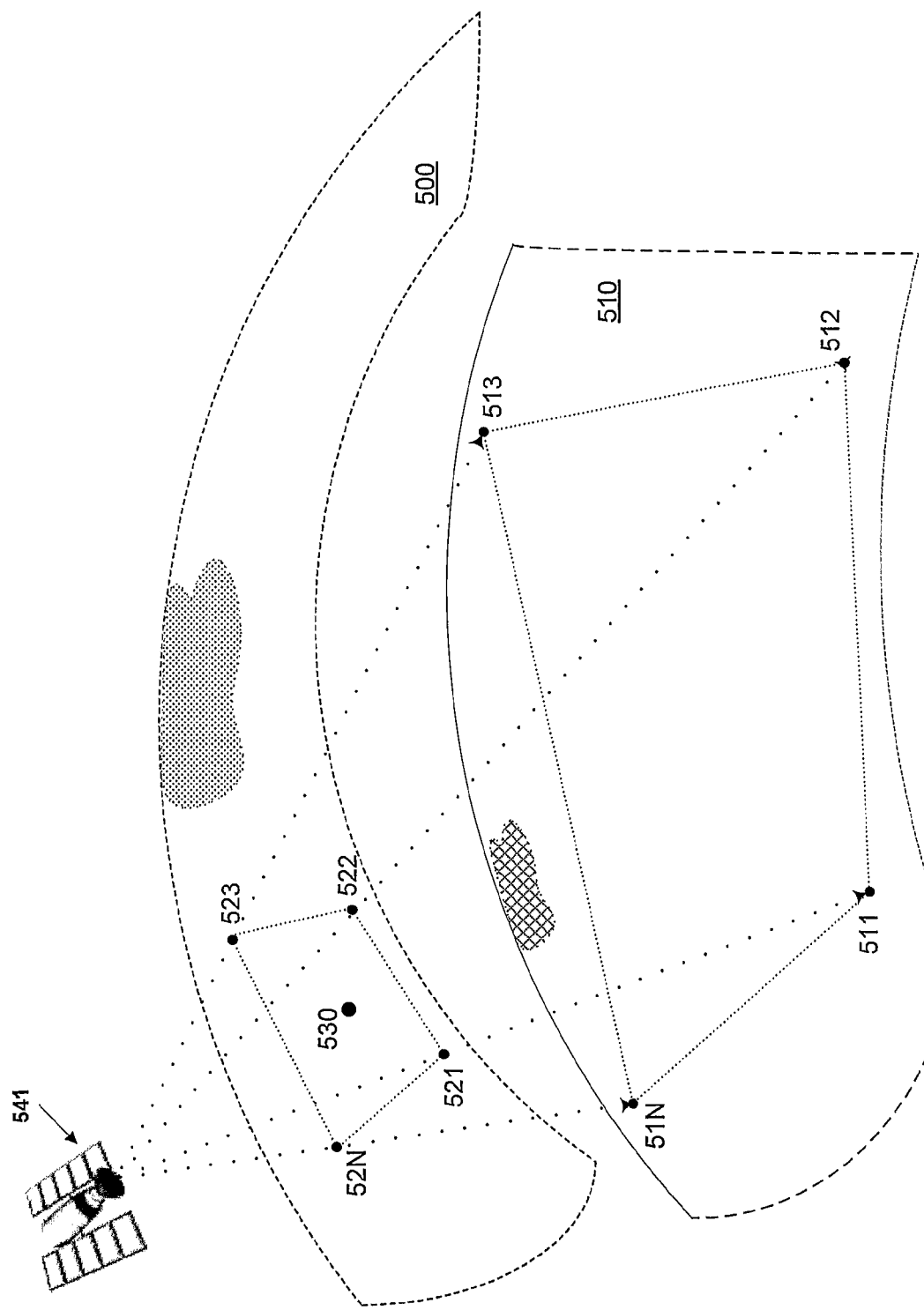
FIG. 5 schematically illustrates modeling of a network projection on an ionospheric shell surrounding the earth in accordance with an embodiment of the invention.

The shift of the wavecrest towards the receiver is a result of the interaction of the electromagnetic radiowave with the ionized gases that form the charged layer of the earth's atmosphere, the so-called ionosphere. The electron density of the ionosphere is known to have a pronounced maximum at an altitude of approximately 350 kilometers above ground. See D. BILITZA, *International Reference Ionosphere* 2000, RADIO SCIENCE 2 (36) 2001, 261. For this reason, many models ascribe the ionospheric effect to a shell surrounding the earth at this altitude. FIG. 5 illustrates a portion 500 of such a shell surrounding the surface 510 of the earth.

As an aid to understanding principles of the present invention, an embodiment will first be described with such a single-layer model. A further embodiment described below includes the disturbance produced by an ionospheric layer of non-zero thickness, with an option for including a varying density as function of altitude.

Referring to FIG. 5, the N reference stations 511, 512, 513, 51N of a network observe the signals of satellite 541, which are perturbed by the ionosphere layer 500. Projection of the network on earth to the ionosphere defines piercepoints 521, 522, 523, 52N for rays from satellite 541 to respective reference stations 511, 512, 513, 51N. The center 530 of this projection is taken as a reference point from which relative coordinates of the piercepoints are calculated as $(\Delta \lambda_n, \Delta \phi_n)$, $n \in \{1, \ldots, N\}$. In principle, however, the definition of the reference point is completely arbitrary.

Figure 6:
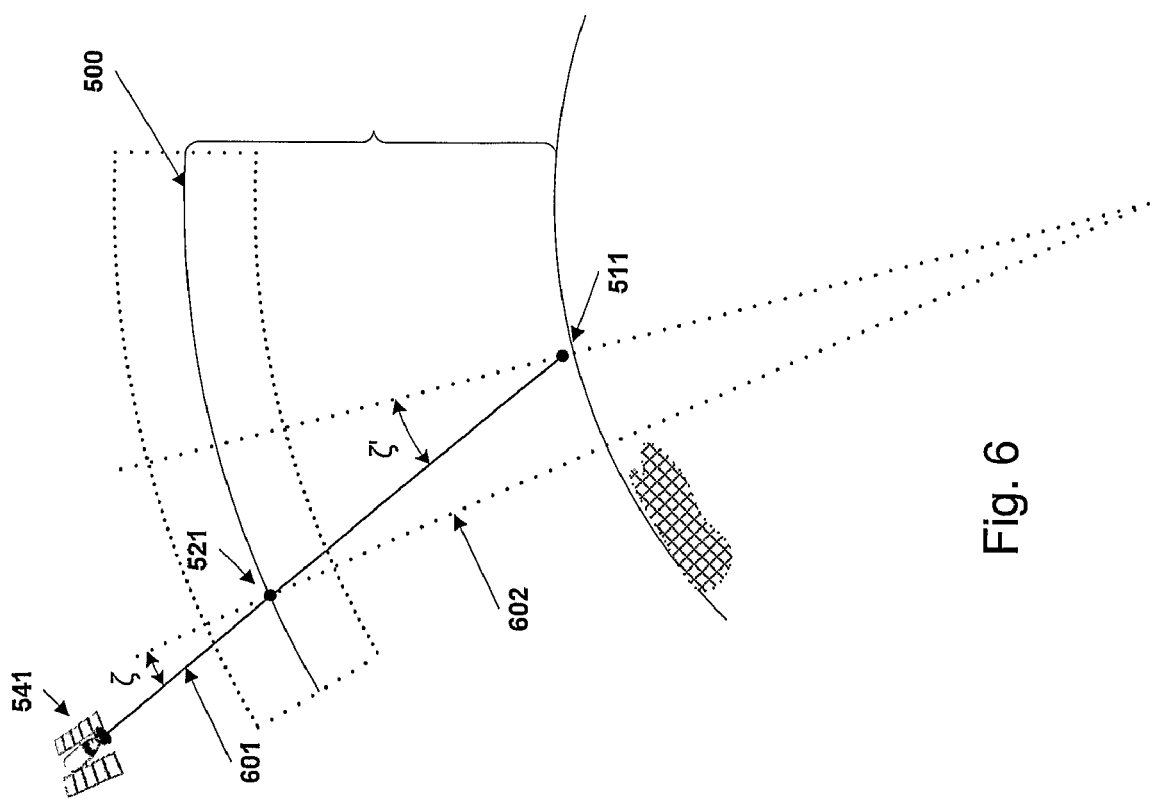
FIG. 6 illustrates a slanted ray path from a satellite to a receiver passing through the ionosphere.

Except when a satellite is directly over a reference station, signal rays penetrate the ionosphere in a slant path from satellite to receiver as shown in FIG. 6, such as signal ray 601 from satellite 541 to reference station 511. This slant path is explicitly accounted for by the so-called mapping function $m_{mapping}(\zeta) = 1/\cos(\zeta)$, where $\zeta$ is the angle of the signal ray with the line perpendicular to the ionospheric sphere through the piercepoint (e.g., line 602). Since the slant path of the signal ray from a given satellite to each reference station penetrates the ionosphere at a different angle, the angle is different for each reference station. Thus, the mapping function is different for each satellite-to-reference-station combination. The effect of the different slant angles can be compensated by relating the geometry-dependent TEC with a geometry-independent VTEC (Vertical TEC) by TEC/

$m_{mapping}(\zeta)$=TEC $\cos(\zeta)$=VTEC. As shown for example in FIG. 6 with respect to reference station 511 and satellite 541, the TEC determined along slant path 601 corresponds to the VTEC along the line 602 perpendicular to the ionospheric sphere 500 at piercepoint 521.

With the relative coordinates that were introduced above and the concept of the mapping function, the ionospheric advance across the network area can be written as (here the uppercase i and j are to be understood as exponents, not indices)

$$I(\Delta\lambda, \Delta\varphi) = m(\Delta\lambda, \Delta\varphi)\left(\sum_{i,j=0}^{\infty} \alpha_{i,j}\Delta\lambda^i \Delta\varphi^j\right). \quad (10.)$$

That is, the ionospheric advance across the network area is expressed in terms of its Taylor series (or any other set of orthogonal functions, such as spherical Bessel functions). For most purposes, and as illustrated here, the expansion can be stopped at first order, and the terminology $a_{1,0}=a_\lambda$ and $a_{0,1}=a_\varphi$ can be introduced. The expression $a_{0,0}=I_0$ is the ionospheric advance at the reference point, while $a_\lambda$ and $a_\varphi$ are the gradients in the ionosphere in the relative coordinates. The ionosphere at the piercepoints is therefore expressed as $$I_n^m = m_n^m(I_0^m + a_\lambda^m \Delta\lambda_n^m + a_\varphi^m \Delta\varphi_n^m). \quad (11.)$$

For each satellite nm in view we thus have the parameters ($I_0^m$, $a_\lambda^m$, $a_\varphi^m$) to characterize the ionosphere across the network area. Those parameters are to be estimated, together with the carrier-phase integer ambiguity and multipath states. Generally, if the expansion Eq. (10) is carried to k-th order, the number of states introduced for the ionosphere is $(k+1)(k+2)/2$. The other terms of Eq. (11) ($m_n^m$, $\Delta\lambda_n^m$, $\Delta\varphi_n^m$) are given by the geometry of the network and the position of satellite in.

Figure 7:
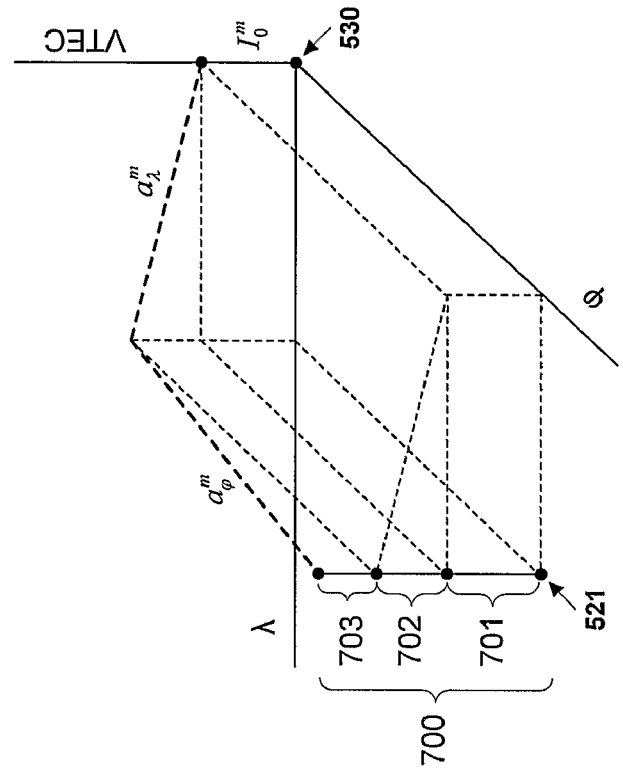
FIG. 7 illustrates how ionospheric parameters describe the ionosphere at a pierce point relative to a reference point in accordance with an embodiment of the invention.

FIG. 7 illustrates how the ionosphere parameters ($I_0^m$, $a_\lambda^m$, $a_\varphi^m$) describe the ionosphere at a piercepoint relative to a reference point. The ionosphere has a VTEC of $I_0^m$ at the reference point, with a slope $a_\lambda^m$ in angular direction $\lambda$ and a slope $a_\varphi^m$ in angular direction $\varphi$. In the example of FIG. 7, the VTEC 700 at piercepoint 521 is the sum of a contribution 701 equal to $I_0^m$, a contribution 702 based on slope $a_\lambda^m$ and the angular distance of piercepoint 521 from reference point 530 in direction $\lambda$, and a contribution 703 based on slope $a_\varphi^m$ and the angular distance of piercepoint 521 from reference point 530 in direction $\varphi$.

While a linear treatment of the ionosphere delivers excellent availability, reliability is increased with an even more realistic model which takes into account the thickness of the ionosphere. As is known (for example from D. BILITZA, *International Reference Ionosphere* 2000, RADIO SCIENCE 2 (36) 2001, 261), the electron density of the ionosphere has a certain profile $f(h)$ as a function of altitude h which peaks sharply at a height between 300-400 kilometers above ground. To calculate the electron content that a ray experiences from satellite m to station n one would calculate the integral $$I_n^m \propto \int_{(x^m, y^m, z^m)}^{(x_n, y_n, z_n)} ds f(h), \quad (12.)$$

where s is the measure along the direct line of sight between station and satellite. Notice how for the simple shell model already considered, $f(h)=\Delta(h-h_0)$ (Dirac Delta distribution), this expression returns the previous mapping function as $$\left.\frac{ds}{dh}\right|_{h_0} = \frac{1}{\cos\varphi}.$$

Figure 8:
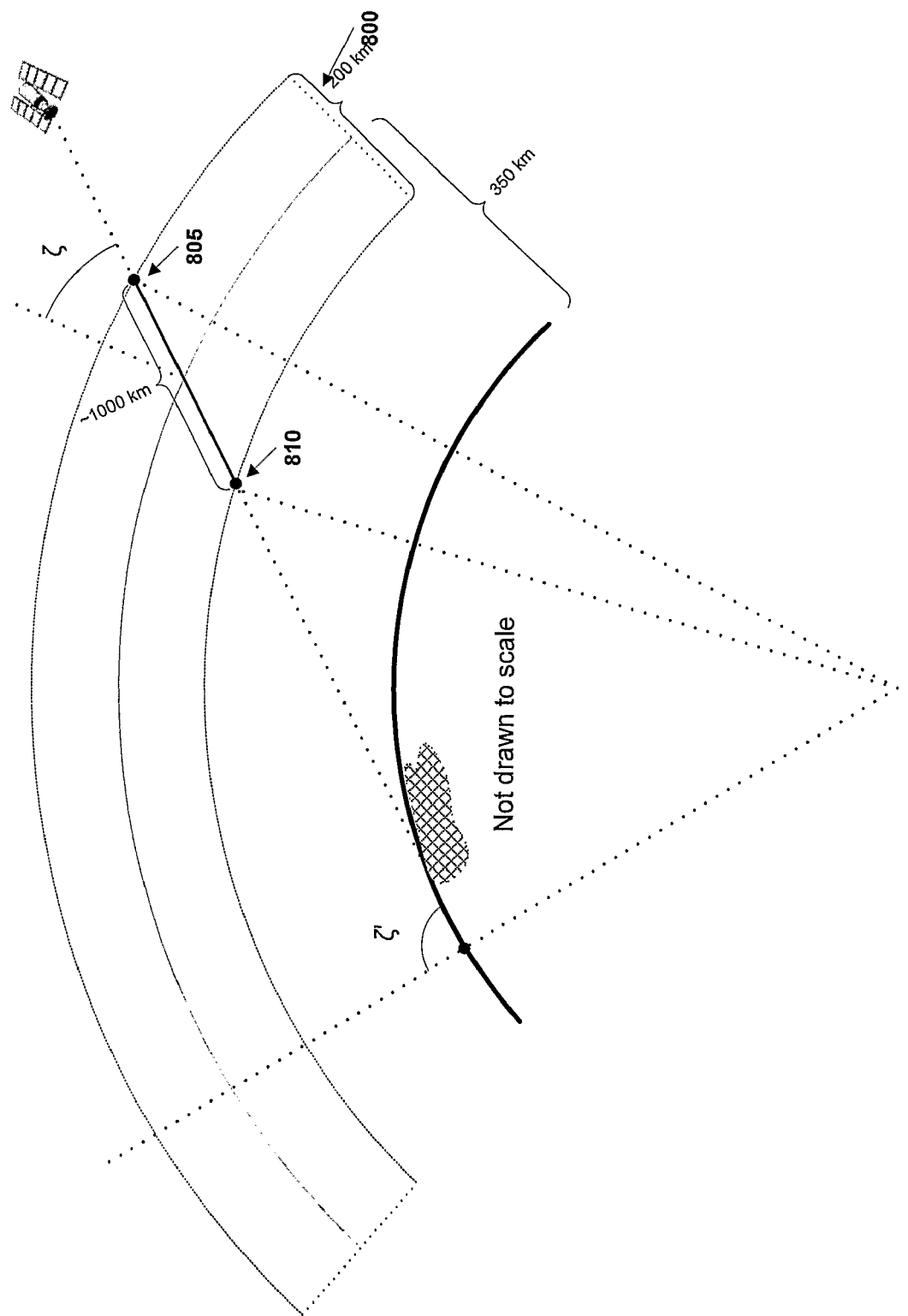
FIG. 8 illustrates a signal ray from a low elevation satellite through the ionosphere to a receiver.

Using suitable parameters for $f(h)$, the integral for all station-satellite pairs can be numerically computed at each epoch. For practical purposes an approximation in terms of a box profile is fully sufficient and delivers improvements over the shell model. It is further assumed that the gradients in the ionosphere do not depend on altitude. This assumption can easily be relaxed by adding further gradient states for different altitudes. That the finite thickness of the ionosphere is an important feature of the model can be understood by picturing the entry and exit point of the ray of a low elevation satellite, e.g., as shown in FIG. 8. If the thickness of the ionospheric shell 800 is 200 kilometers, entry point 805 and exit point 810 might be separated by some 1000 kilometers. With typical gradients of $a_\lambda$, $a_\varphi \sim 10^{-3}$ m/km, the contributions to the calculation of ionospheric advance differ greatly from entry point to exit point.

The state vector $\vec{x}^m$ which contains the state variables to be estimated individually for each satellite m is thus summarized as $$\vec{x}^m = (N_1^m, \ldots, N_N^m, MP_1^m, \ldots, MP_N^m, I_0^m, a_\lambda^m, a_\varphi^m), \quad (13.)$$

in which $N_1^m, \ldots, N_N^m$ is the geometry-free combination of the integer numbers of carrier-phase wavelengths from satellite m to each reference station n of N reference stations discussed at Equ. (4.) above;

$MP_1^m, \ldots, MP_N^m$ is the multipath effect on signals from satellite m to each reference station n of N reference stations;

$I_0^m$ is the VTEC of the ionosphere at the reference point;

$a_\lambda^m$ is the gradient of the VTEC of the ionosphere in angular direction $\lambda$ from the reference point; and $a_\varphi^m$ is the gradient of the VTEC of the ionosphere in angular direction $\varphi$ from the reference point.

Filtering Algorithm

To extract the parameters of state vector $\vec{x}^m$ from the time series of observations, a standard Kalman filtering algorithm is applied. To simplify notation, the superscript m referring to satellite (or Kalman filter) m is dropped It is to be understood that the following Kalman filter is applied individually to the reference-station observations for each satellite m. The observation matrix (or design matrix) H which relates the current phase measurement at each of the N reference stations receiving signals from the satellite to the state variables of state vector $\vec{x}^m$ is given by (see Equ. (2) and Equ. (11) and Equ. (13))

$$H = \begin{pmatrix} & & & m_1 & m_1\Delta\lambda_1 & m_1\Delta\varphi_1 \\ -\mathcal{J}_{N\times N} & \mathcal{J}_{N\times N} & & \vdots & \vdots & \vdots \\ & & & m_N & m_N\Delta\lambda_N & m_N\Delta\varphi_N \end{pmatrix}, \quad (14.)$$

such that with $\vec{l}=(\phi_1, \ldots, \phi_N)$, $$\vec{l} = H\vec{x}. \quad (15.)$$

(The term $\mathfrak{I}_{N \times N}$ indicates an N-dimensional unity matrix.) From here on, we drop the arrow above letters which indicates that a variable is a vector. It will be clear from the context when we are dealing with vectors. The state transition matrix used to calculate an estimate for the upcoming state $x^-$ from the current state $x_+$ requires some geometric considerations. From one epoch $t_{i-1}$ to the next epoch $t_i$, the locations of the piercepoints change due to the motion of the satellites and the rotation of the earth. Therefore, from one epoch to the next the coordinates of the individual piercepoints will shift by $\delta\lambda_i$, $\delta\phi_i$ and the coordinates of the reference point (center of the network projection on the ionosphere) will shift by $\Delta\Lambda_{CPP}$, $\Delta\Phi_{CPP}$. For this reason the estimate of $I_0$ changes accordingly, as enforced by the design matrix $$\Phi = \begin{pmatrix} \mathcal{J}_{N \times N} & & & & \\ & e^{-t/t_c^{MP}} \mathcal{J}_{N \times N} & & & \\ & & 1 & \Delta\Lambda_{CPP} & \Delta\Phi_{CPP} \\ & & 0 & 1 & 0 \\ & & 0 & 0 & 1 \end{pmatrix} \quad (16.)$$

The exponential function $e^{-t/t_e^{MP}}$ that applies to the multipath elements of the state simulates a Gauss-Markov behavior on the multipath with time constant $t_c^{MP}$. The state estimate $I_k^-$ for the upcoming epoch k is given by the state $I_{k-1}^+$ of the prior epoch k-1, by $$I_k^- = \Phi_{k-1} I_{k-1}^+. \quad (17.)$$

Produced along with the projected state estimate is a projected variance-covariance matrix for this state which is obtained from error propagation as $$P_k^- = \Phi_{k-1} P_{k-1}^+ \Phi_{k-1}^T + Q_{k-1} \quad (18.)$$

The system driving noise $Q_k$ is designed to simulate the dynamical processes relevant for the evolution of the states and is therefore model dependent. For example, assuming a random walk process on the absolute term of the ionosphere and gradients leads to the diagonal $$Q = \begin{pmatrix} 0_{N \times N} & & & & \\ & \sigma_{MP}^2 (1 - e^{-2t/t_c^{MP}}) \mathcal{J}_{N \times N} & & & \\ & & q_I & 0 & 0 \\ & & 0 & q_\lambda & 0 \\ & & 0 & 0 & q_\varphi \end{pmatrix} \quad (19.)$$

where the multipath states experience the noise input with a time dependence in accordance with a Gauss-Markov process. (Here $0_{N \times N}$ is an N-dimensional block matrix filled with zeros). It is assumed that $\sigma_{MP}^2$ is a constant modulated with $1/\sin^2$ (Elevation Angle). Experience with datasets from different networks around the world show that $(5 \text{ mm})^2$ is a choice that equally suits all networks. Terms $q_\lambda$ and $q_\phi$ are related to the velocity with which the network projection travels across the ionosphere. A linear relation is used together with a constant parameter. Modeling of the gradients in terms of a Gauss Markov process is a desirable option as it keeps the values of the parameters from drifting off to too-large values. The error propagation matrix of the state $P_1$ is initialized with diagonal elements which are set to infinity for the ambiguities, and defined by parameters for multipath and ionospheric values. From the state and error estimates the Kalman gain is estimated (using the measurement noise matrix $P_1$) as $$K_k = P_k^- H_k^T (H_k P_k^- H_k^T + R_k)^{-1}. \quad (20.)$$

Together with the measurement $l_k$ of epoch k, the state estimate is updated by $$x_k^+ = x_k^- + K_k (l_k - H_k x_k^-). \quad (21.)$$

Finally, the error estimate for this epoch is given as $$P_k^+ = (\mathfrak{I}_{N \times N} - K_k H_k) P_k^-. \quad (22.)$$

This completes the algorithm describing how the components of the state vector are extracted from the noisy observation data acquired at the reference stations.

Further Use of Ionosphere Information

The method presented above delivers a faster and more reliable filtering algorithm by adapting a physically more accurate model of the ionosphere across a network of GPS receivers. In addition, the extracted ionosphere parameters ($I_0^m$, $a_\lambda^m$, $a_\phi^m$) contain physical information that can be interpolated to any location within the network (or slightly outside), as described with reference to FIG. 5 and FIG. 7. This is particularly helpful to the user of a mobile receiver unit (rover), where the ionospheric information can be used immediately to improve the local positioning solution even for the case of a single-frequency receiver. Assume the rover's coordinates ($x_r$, $y_r$, $z_r$) are approximately known to the rover and that the extracted ionospheric parameters ($I_0^m$, $a_\lambda^m$, $a_\phi^m$) are transmitted from the network to the rover. For these approximate coordinates the ionospheric piercepoints and the mapping functions $m_r$ to all relevant satellites can be readily calculated. As described above for the reference stations, the relative coordinates ($\Delta\lambda_r^m$, $\Delta\phi_r^m$) to the reference point of the network projection can be calculated for the piercepoint of a signal ray from satellite in to rover r. Similarly to Equation (10) or (11), estimates of the ionospheric correction for the rover with the parameters extracted from the filtering algorithm can be given as $$I_r^m = m_r^m (I_0^m + a\lambda^m \Delta\lambda_r^m + a_\phi^m \Delta\phi_r^m). \quad (23.)$$

Application to 3+ Frequencies

The model presented above is also applicable for the signals on three or more frequencies that will be supplied by the modernized GPS system and the Galileo system.

The model can be directly applied as described above for the current GPS system by using measurements of two of the three or more carriers. In this case it is preferable to select for the geometry-free filter the two carriers having the greatest frequency (and wavelength) difference. With more than two carriers, an additional (different) linear combination of the phase measurements can be processed in a filter equivalent to the one presented here which will lead to reduced errors and improve resolution times of ambiguities and ionospheric parameters. With three or more frequencies, two frequencies can be used for the geometry-free filter and the additional frequency or frequencies can be introduced in the Q filter described in United States Published Patent Application US2005/0101248 A1.

Exemplary Embodiments

The inventive concepts described above can be employed in a wide variety of processes and equipment. Some exemplary embodiments will now be described. It will be understood that these are intended to illustrate rather than to limit scope of the invention.

Figure 9:
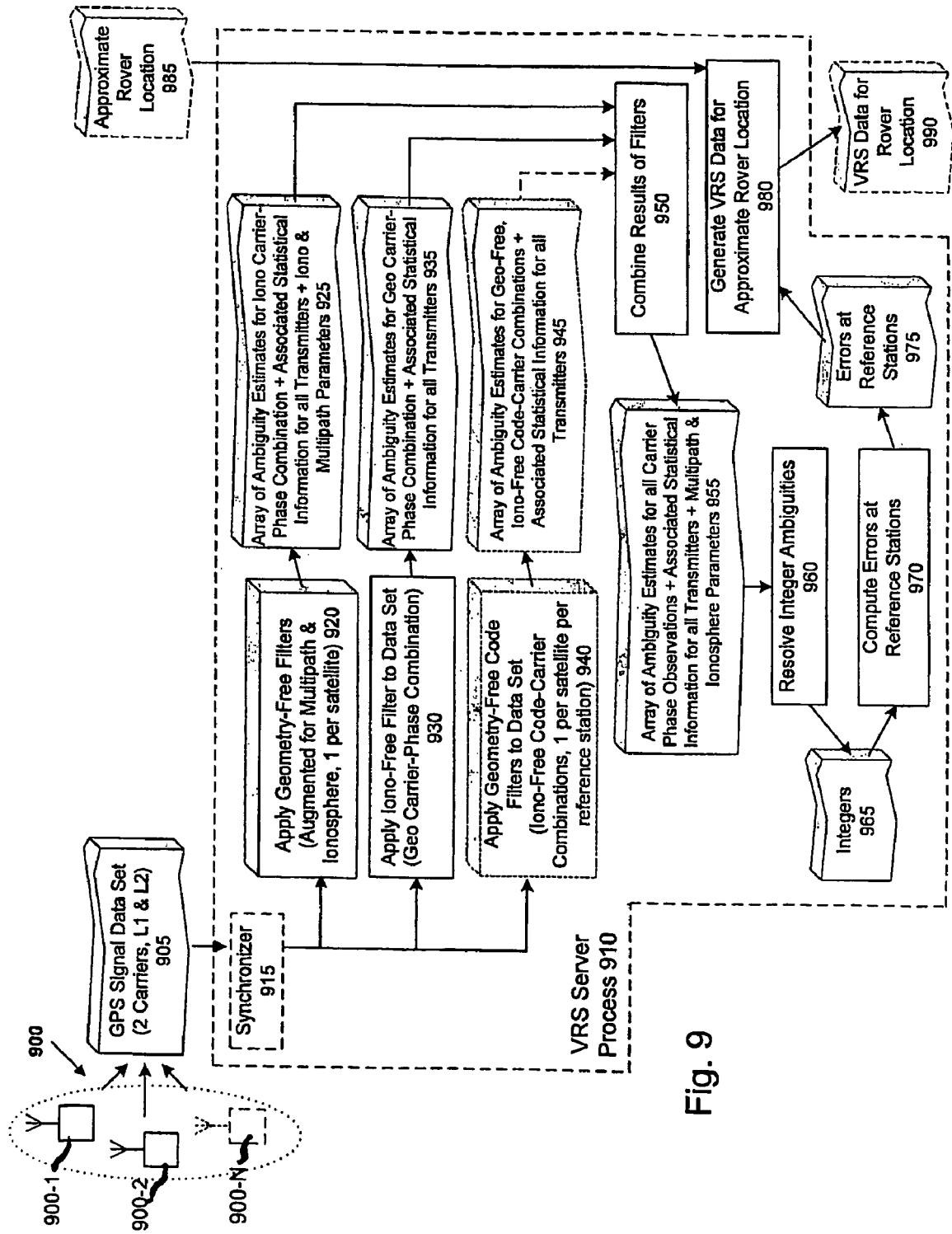
FIG. 9 schematically illustrates a solution for processing of two-carrier GNSS signal data in accordance with an embodiment the invention.

FIG. 9 schematically illustrates a solution for processing of two-carrier GNSS signal data in accordance with the invention. Network receivers 900 supply a set of GNSS signal data 905 having observations of L1 and L2 for multiple satellites. GNSS signal data set 905 are processed in a VRS (Virtual Reference Station) Server Process 910. After passing the signal data through a synchronizer at 915 they are supplied to separate filter processes: a geometry-free filter process 920, an ionosphere-free filter process 930, and an optional geometry-free and ionosphere-free code filter process 940. Geometry-free filter process 920 uses a bank of geometry-free filters (e.g., as at 300 in FIG. 3) augmented with multipath $(MP_1^m, \ldots, MP_N^m)$ and ionosphere parameters $(I_0^m, a_\lambda^m, a_\phi^m)$. Each filter of the filter bank corresponds to an observed satellite (e.g., filters 301, 302, ... 30M). The filters of geometry-free filter process 920 use geometry-free ionosphere carrier-phase combinations to obtain an array 925 of ambiguity estimates for the ionosphere carrier-phase combination and associated statistical information, as well as multipath $(MP_1^m, \ldots, MP_N^m)$ and ionosphere parameter $(I_0^m, a_\lambda^m, a_\phi^m)$ values. Ionosphere-free filter process 930 employs a geometry carrier-phase combination to obtain an array 935 of ambiguity estimates for the geometry carrier-phase combination and associated statistical information. Code filter process 940 uses geometry-free and ionosphere-free code-carrier combinations to obtain an array 945 of ambiguity estimates for the geometry-free and ionosphere-free code-carrier combinations and associated statistical information. Arrays 925, 935 and 945 are supplied to a combining process 950 to obtain an array 955 of ambiguity estimates for all carrier-phase observations and associated statistical information. Array 955 is supplied to a computation process 960 to compute the integer values of the ambiguities. With the resulting integers of 965 and the original GNSS data from the synchronizer, the errors at the reference stations are calculated at 970. Using these errors 975, VRS data at the approximate location of the rover is calculated at 980 by shifting data from a reference station close to the rover location. Preferentially one chooses the data from the station closest to the rover. This data stream is supplied to the rover at 990.

Figure 10:
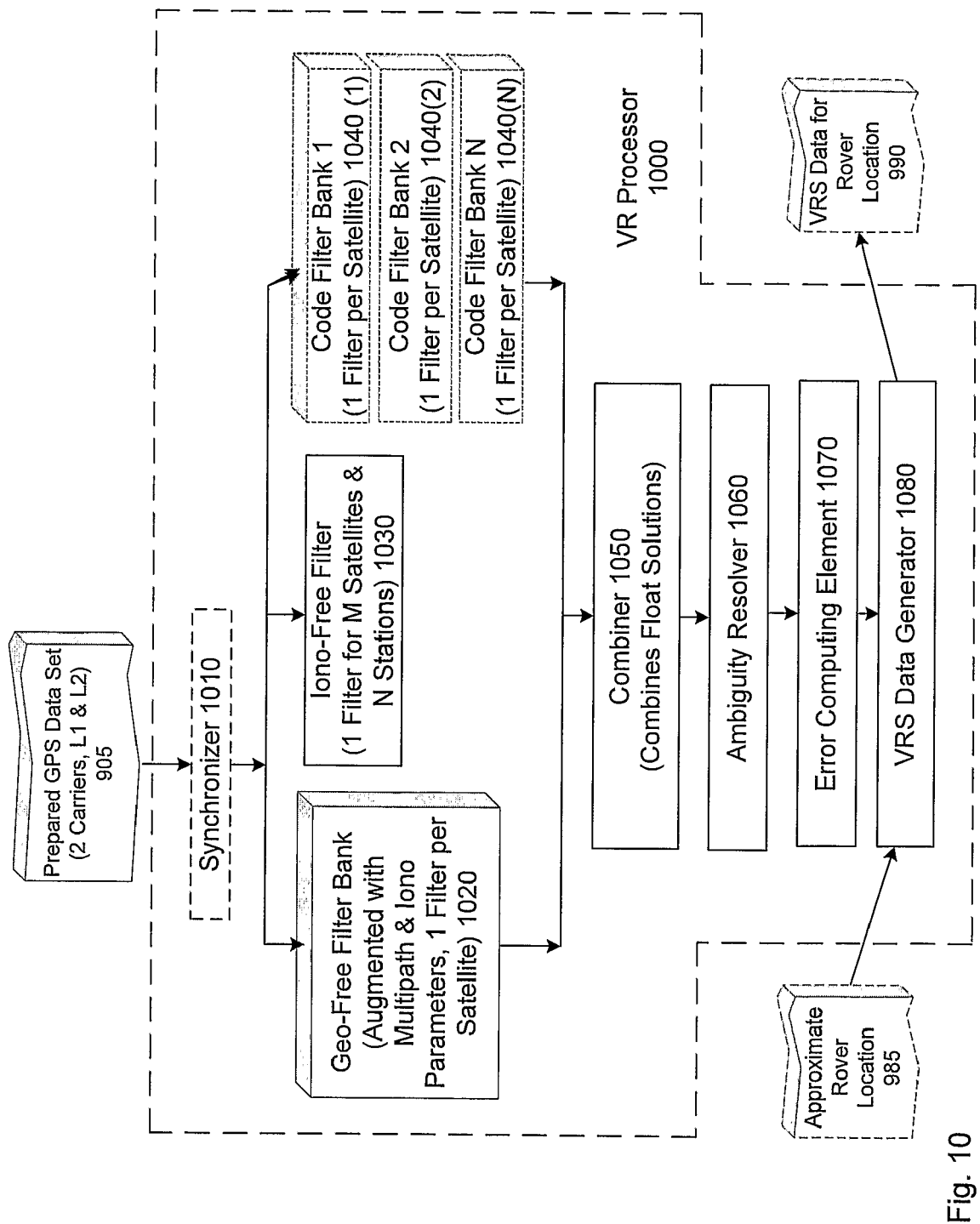
FIG. 10 shows the structure of filters useful in the process of FIG. 9.

FIG. 10 shows the structure of filters useful in the process of FIG. 9. GPS signal data set are supplied to a VRS processor. After synchronization in 1010, they are streamed to a bank of geometry-free filters 1020 augmented with multipath $(MP_1^m, \ldots, MP_N^m)$ and ionosphere parameters $(I_0^m, a_\lambda^m, a_\phi^m)$ as described. Each filter of bank 1020 processes the observations taken at multiple reference stations for a single satellite; one filter is provided for each of M observed satellites. GPS signal data set 905 is supplied to a single ionosphere-free filter 1030 which processes the observations of all M observed satellites. GPS signal data set is optionally supplied to code filter bank 1040. Required is then one bank per station, where each bank holds one filter per satellite. Each filter of bank 1040 processes the observations taken at multiple reference stations for a single satellite; one filter is provided for each of M observed satellites. A combiner 1050 bundles the float solution of the different filters, followed by an integer ambiguity resolution at 1060. The ambiguities are applied to the measurements of the reference stations to calculate the errors at the reference stations at 1070. Given the approximate location of the rover 985 a VRS data stream is calculated at 1080 and a data stream of VRS data provided to the rover at 990.

Figure 11:
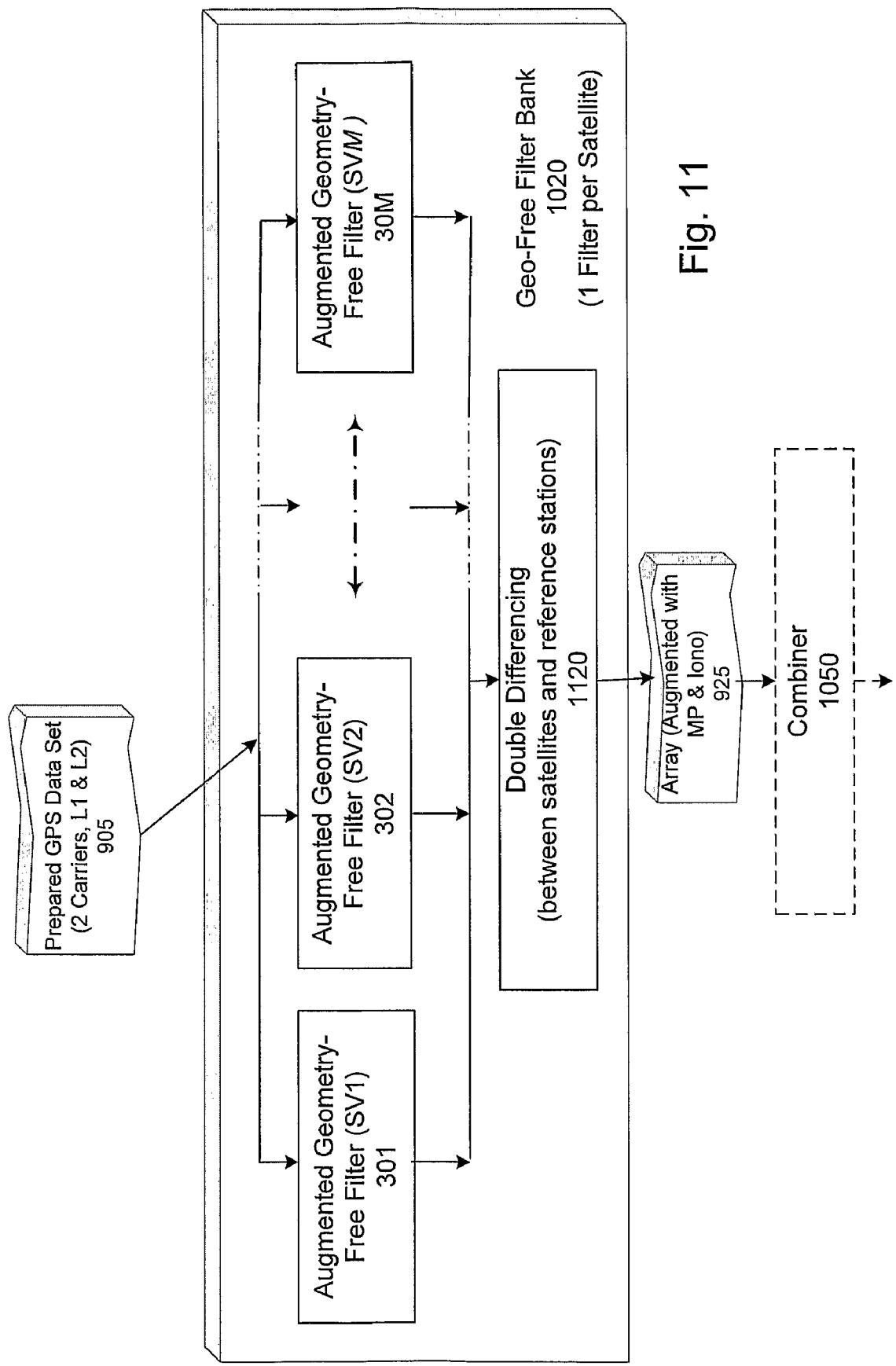
FIG. 11 shows the structure of the geometry-free filter bank of FIG. 10.

FIG. 11 shows in more detail the structure of geometry-free filter bank 1020. One filter 301, 302, ..., 30M is provided for processing observations taken at the reference stations of a respective one of observed satellites SV1, SV2, ..., SVM. The state vector of each of filters 301, 302, ..., 30M is augmented with multipath $(MP_1^m, \ldots, MP_N^m)$ and ionosphere parameters $(I_0^m, a_\lambda^m, a_\phi^m)$. A double-differencing operator 1120 is provided for taking double differences between satellites and reference stations.

Figure 12:
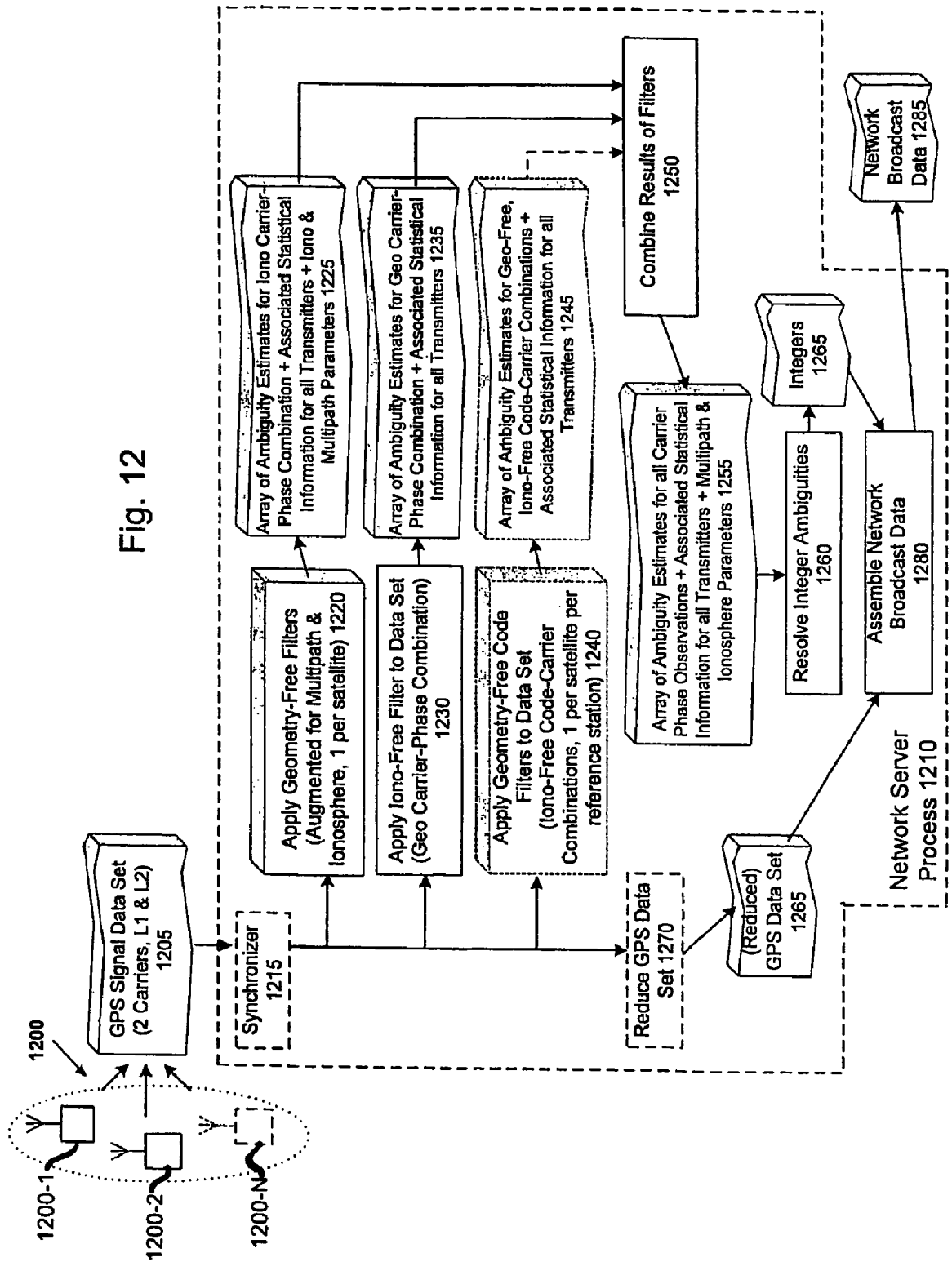
FIG. 12 schematically illustrates a further solution for processing of two-carrier GPS signal data in accordance with an embodiment of the invention.

FIG. 12 schematically illustrates a solution for processing of two-carrier GPS signal data in accordance with the invention. Network receivers 1200 supply a set of GPS signal data 1205 having observations of L1 and L2 for multiple satellites. GNSS signal data set 1205 are processed in a Network Server process 1210. After passing the signal data through a synchronizer at 1215 they are supplied to separate filter processes: a geometry-free filter process 1220, an ionosphere-free filter process 1230, and an optional geometry-free and ionosphere-free code filter process 1240. Geometry-free filter process 1220 uses a bank of geometry-free filters (e.g., as at 300 in FIG. 3) augmented with multipath $(MP_1^m, \ldots, MP_N^m)$ and ionosphere parameters $(I_0^m, a_\lambda^m, a_\phi^m)$. Each filter of the filter bank corresponds to an observed satellite (e.g., filters 301, 302, ... 30M). The filters of geometry-free filter process 1220 use geometry-free ionosphere carrier-phase combinations to obtain an array 1225 of ambiguity estimates for the ionosphere carrier-phase combination and associated statistical information, as well as multipath $(MP_1^m, \ldots, MP_N^m)$ and ionosphere parameter $(I_0^m, a_\lambda^m, a_\phi^m)$ values. Ionosphere-free filter process 1230 employs a geometry carrier-phase combination to obtain an array 1235 of ambiguity estimates for the geometry carrier-phase combination and associated statistical information. Code filter process 1240 uses geometry-free and ionosphere-free code-carrier combinations to obtain an array 1245 of ambiguity estimates for the geometry-free and ionosphere-free code-carrier combinations and associated statistical information. Arrays 1225, 1235 and 1245 are supplied to a combining process 1250 to obtain an array 1255 of ambiguity estimates for all carrier-phase observations and associated statistical information, as well as multipath $(MP_1^m, \ldots, MP_N^m)$ and ionosphere parameter $(I_0^m, a_\lambda^m, a_\phi^m)$ values. Array 1255 is supplied to a computation process 1260 to compute the integer values of the ambiguities. The resolved ambiguities are applied directly to the individual measurements of GPS signals at 1205 to assemble network broadcast data at 1280. This ambiguity free data is streamed to any location within the network as network broadcast data in 1285.

Figure 13:
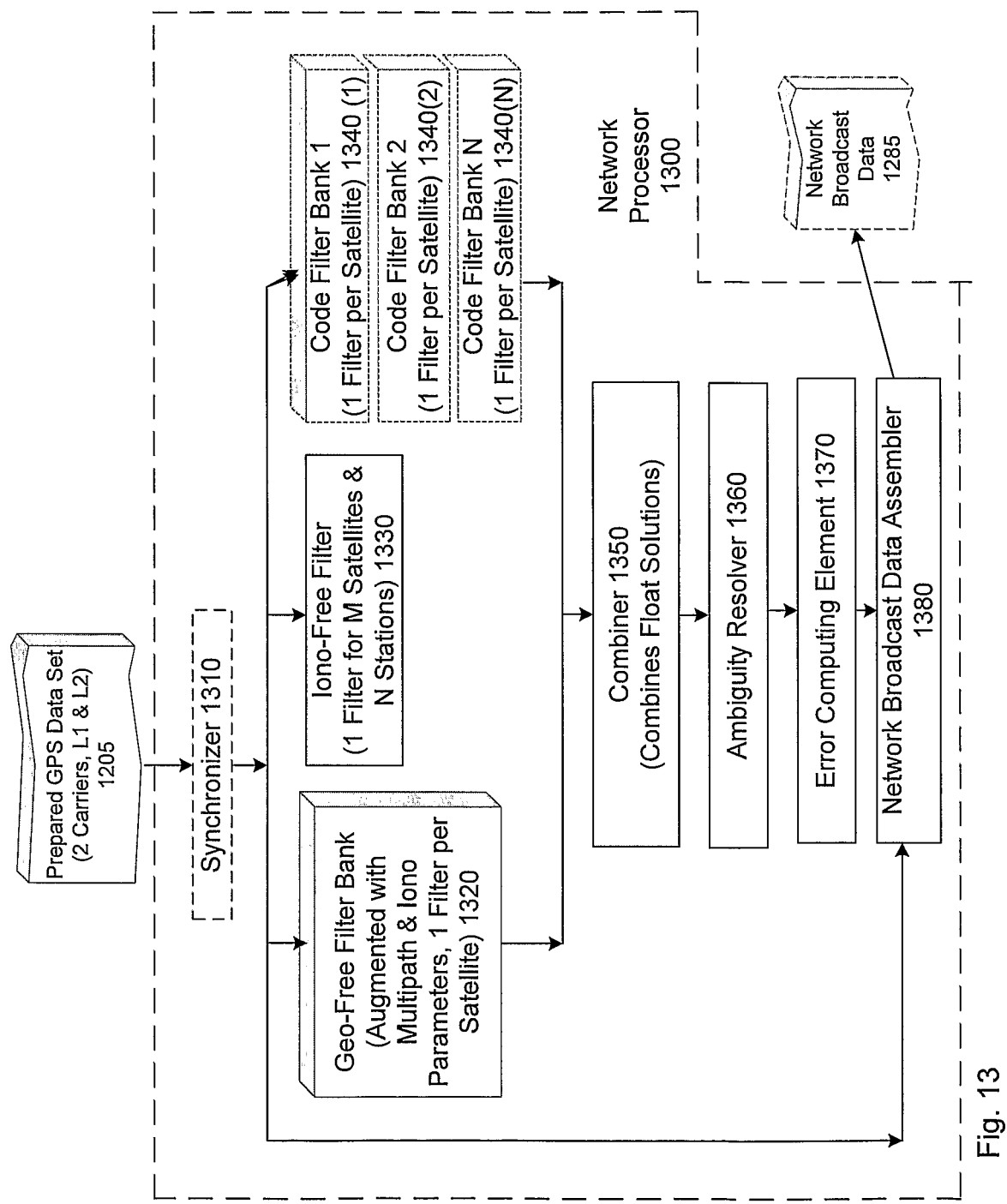
FIG. 13 shows the structure of filters useful in the process of FIG. 12.

FIG. 13 shows the structure of filters useful in the process of FIG. 12. GPS signal data set 1205 are supplied to a VRS processor. After synchronization in 1310, they are streamed to a bank of geometry-free filters 1320 augmented with multipath $(MP_1^m, \ldots, MP_N^m)$ and ionosphere parameters $(I_0^m, a_\lambda^m, a_\phi^m)$ as described. Each filter of bank 1320 processes the observations taken at multiple reference stations for a single satellite; one filter is provided for each of M observed satellites. GPS signal data set 1205 is supplied to a single ionosphere-free filter 1330 which processes the observations of all M observed satellites. GPS signal data set 1205 is optionally supplied to code filter bank 1340. Each filter of bank 1340 processes the observations taken at multiple reference stations for a single satellite; one filter is provided for each of M observed satellites. A combiner 1350 bundles the float solution of the different filters, followed by an integer ambiguity resolution at 1360. The ambiguities are applied to the measurements of the reference stations to calculate the errors at the reference stations at 1370. The resolved ambiguities are applied to the synchronized data stream 1205 in a network broadcast assembler at 1380. This ambiguity free data is streamed to any location within the network as network broadcast data in 1285.

Figure 14:
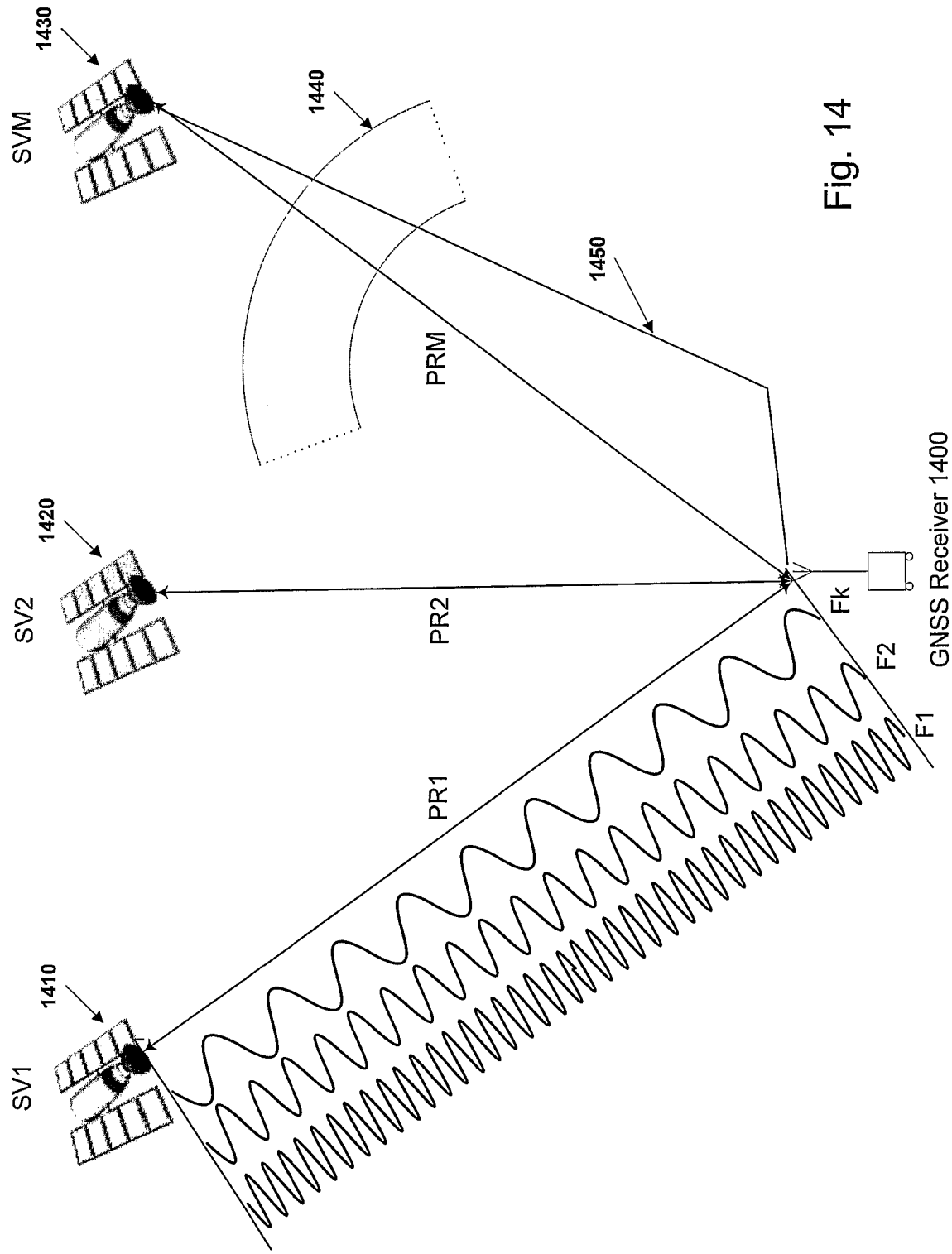
FIG. 14 schematically illustrates a typical prior-art scenario with a three-frequency GNSS.

FIG. 14 schematically illustrates a three-carrier-frequency scenario, such as proposed for Galileo and for modernized GPS. Receiver 1400 receives GNSS signals from any number of satellites in view, such as SV1, SV2 and SVm, shown respectively at 1210, 1220 and 1230. The signals pass through the earth's atmosphere, shown schematically at 1440. Each signal has three or more frequencies, f1, f2, . . . fk. Receiver 1400 determines from the signals a respective pseudo-range, PR1, PR2, PRm, to each of the satellites. Atmospheric and multipath effects cause variations in the signal path, as indicated schematically at 1450, which distort the pseudo-range determinations.

Figure 15:
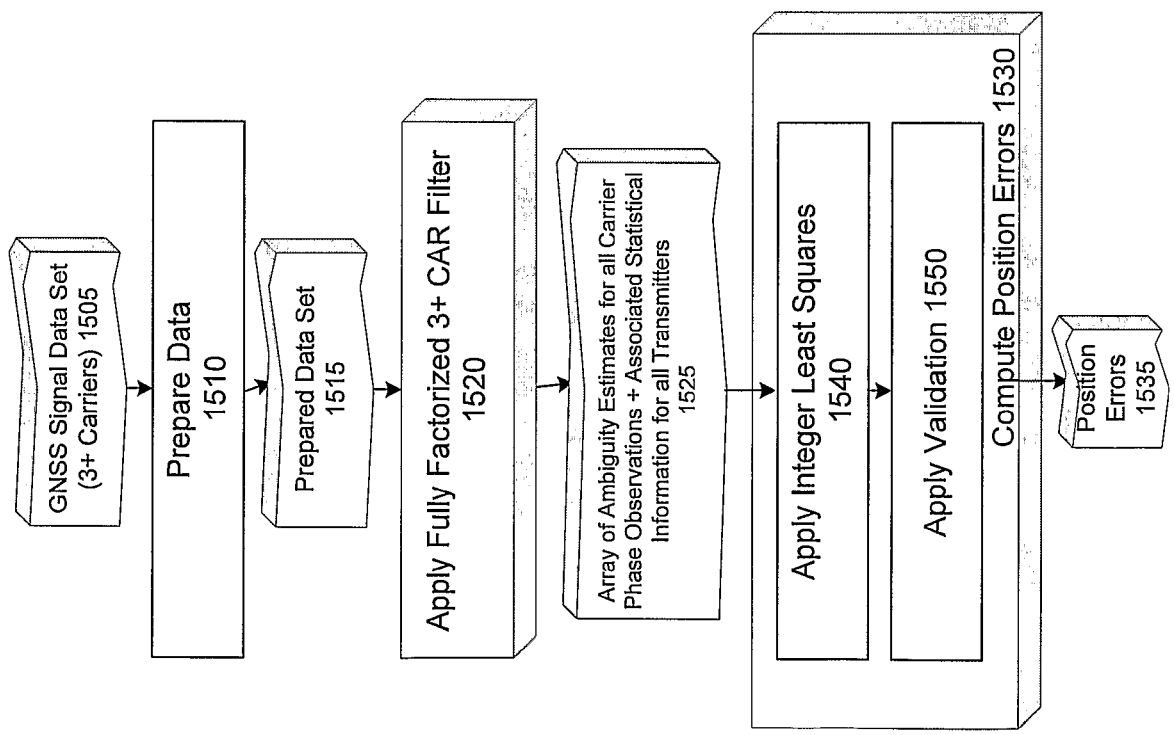
FIG. 15 shows a solution in accordance with the invention suitable for a GNSS system having three or more carrier frequencies.

FIG. 15 is a flowchart illustrating an architecture for computing GNSS position employing factorized ambiguity resolution of GNSS signals for three or more carriers in accordance with an embodiment of the invention. A GNSS signal data set 1505 is obtained by observing signals received from multiple satellites SV1, SV2, . . . SVM at a plurality of reference stations. GNSS signal data set 1505 is supplied to a processing element 1510 which prepares the data for filtering, and the resulting prepared data 1415 is then supplied to a processing element 1520 which applies fully-factorized carrier-ambiguity-resolution (CAR) filters to the prepared data.

Features and variations of fully-factorized carrier-ambiguity-resolution (CAR) filters are described in United States Patent Application Publication US2005/0101248 A1, published May 12, 2005; in accordance with the present invention the geometry-free filters of the fully-factorized CAR filter are modified by augmenting the state vectors of the geometry-free filters with multipath $(MP_1^m, \ldots, MP_N^m)$ and ionosphere parameters $(I_0^m, a_\lambda^m, a_\phi^m)$. The content of United States Patent Application Publication US2005/0101248 A1 is incorporated herein by this reference.

The result of applying fully-factorized CAR filter element 1520 to the prepared data is an array 1525 of ambiguity estimates for all carrier-phase observations and associated statistical information for all transmitters (e.g. for all observed GNSS satellites and/or pseudolites). Array 1525 is supplied to an element 1530 that resolves the integer ambiguity. These ambiguities again are used in the computation of errors in the error computing element 1370, which provides the errors at the reference stations at 1535.

Figure 16:
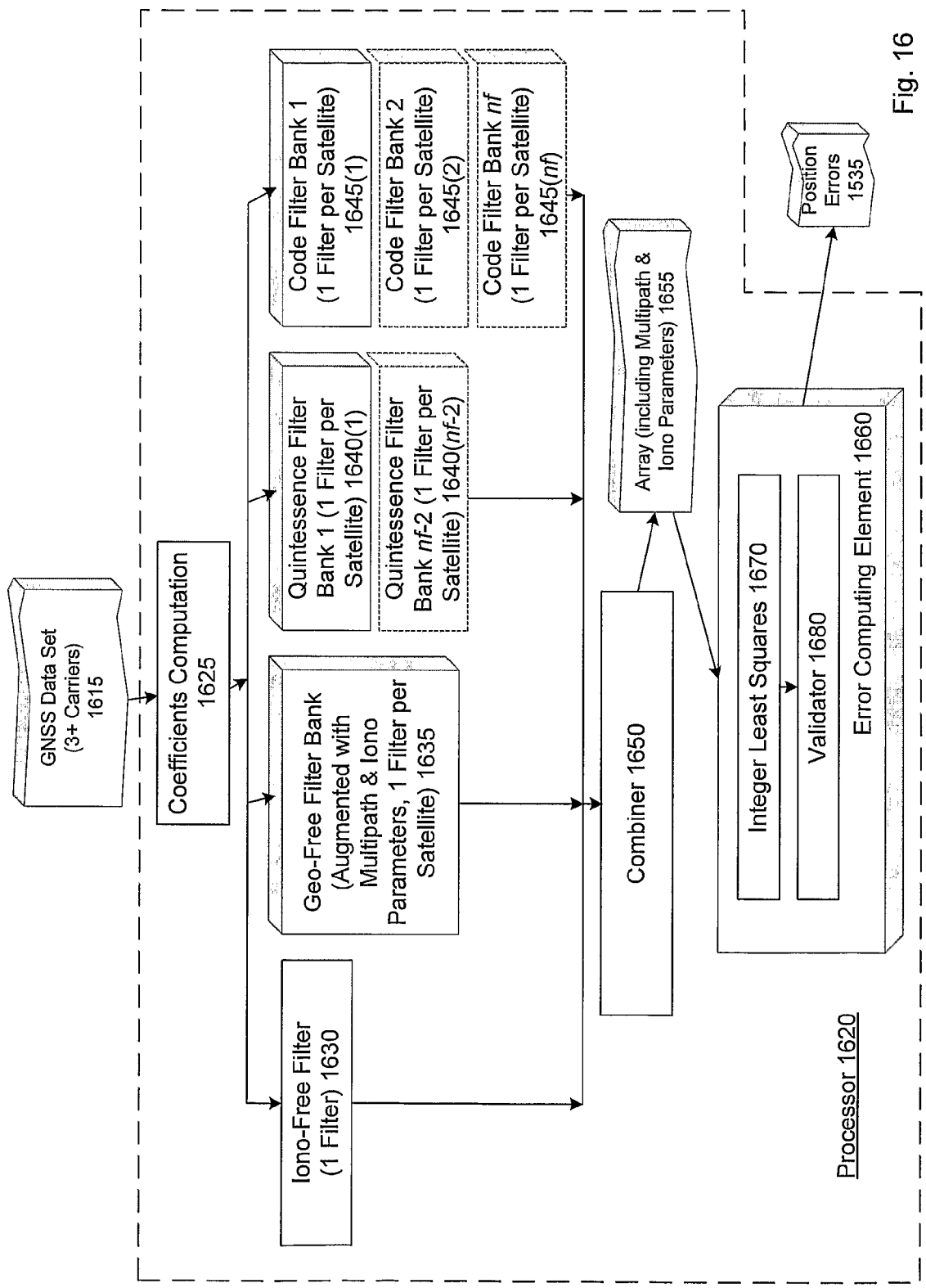
FIG. 16 illustrates an architecture for computing position using a GNSS system having three or more carrier frequencies in accordance with an embodiment of the invention.

FIG. 16 shows the structure of a fully-factorized 3+ carrier ambiguity resolution filter 1620 as modified in accordance with embodiments of the invention and suitable for carrying out filter process 1520. A prepared GNSS signal data set 1615 is supplied to a fully factorized CAR filter 1520, which contains a number of elements for carrying out sub-processes. Element 1625 computes coefficients from the prepared data set which serve to form linear combinations of the observed measurements to be processed in the filter. The prepared data set with computed coefficients is passed to a plurality of sub-filters. These sub-filters include: a single ionosphere-free filter 1630; a geometry-free filter bank 1635 having one filter per observed satellite, the state vector of each geometry-free filter augmented with multipath $(MP_1^m, \ldots, MP_N^m)$ and ionosphere parameters $(I_0^m, a_\lambda^m, a_\phi^m)$; one or more Quintessence filter banks 1640(1) to 1640($nf$-2) in which each filter bank has one filter per observed satellite; and one or more code filter banks 1645(1) to 1645($nf$) in which each filter bank has one filter per observed satellite, where Of is the number of GNSS carrier frequencies. Arrays produced by the sub-filters are supplied to a combiner 1650 which provides a combined array 1655 of ambiguity estimates for all carrier phase observations with associated statistical information. Array 1655 is supplied to an element 1660 which resolves ambiguities. The number of Quintessence filter banks is two less than the number nf of carrier frequencies of the GNSS signal data set 1615, as explained in United States Patent Application Publication US2005/0101248 A1.

Figure 17:
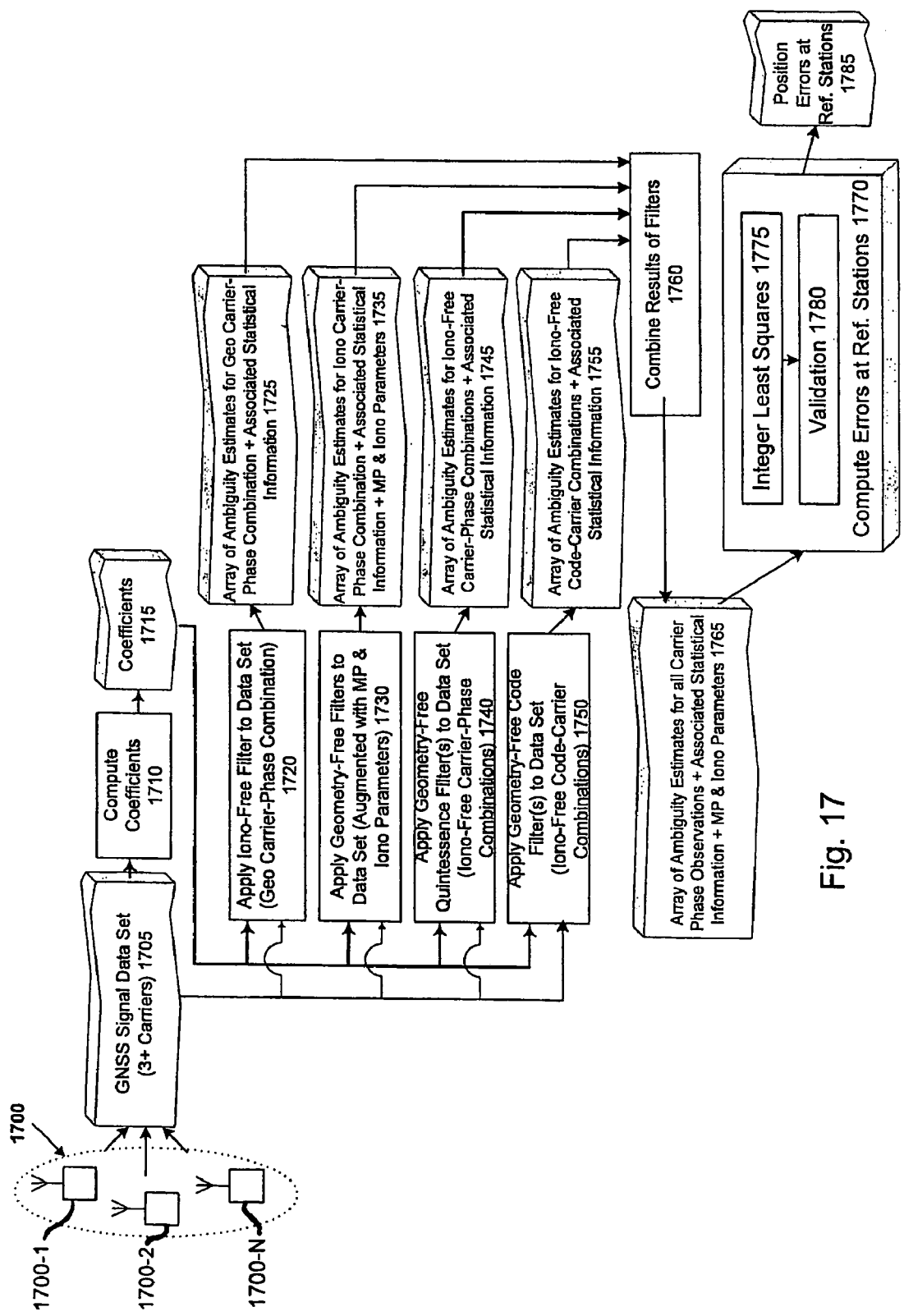
FIG. 17 shows a further solution in accordance with the invention suitable for a GNSS system having three or more carrier frequencies.

FIG. 17 schematically illustrates a method in accordance with embodiments of the invention for processing a GNSS signal data set 1705 with three or more carriers. GNSS signal data set 1705 is optionally processed at 1710 to compute coefficients 1715 for use in the sub-filters of a fully-factorized 3+ carrier ambiguity resolution filter, such as filter 1720; coefficients 1715 may alternatively be computed in the sub-filters at the cost of somewhat greater processing burden. Computation of the coefficients is described in United States Patent Application Publication US2005/0101248 A1. Sub-filter process 1720 applies to data set 1705 an ionosphere-free filter such as ionosphere-free filter 1630 using a geometry carrier-phase combination to obtain an array 1725 of ambiguity estimates for the geometry carrier-phase combination and associated statistical information. Sub-filter process 1730 applies to data set 1705 a bank of geometry-frees filters such as geometry-free filter bank 1635 using a geometry-free iono-sphere carrier-phase combination augmented with multipath $(MP_1^m, \ldots, MP_N^m)$ and ionosphere parameters $(I_0^m, a_\lambda^m, a_\phi^m)$ to obtain an array 1635 of ambiguity estimates for the ionosphere carrier-phase combination and associated statistical information, as well as multipath $(MP_1^m, \ldots, MP_N^m)$ and ionosphere parameters $(I_0^m, a_\lambda^m, a_\phi^m)$. Sub-filter process 1740 applies to data set 1705 at least one bank of Quintessence filters such as Quintessence filter banks 1540(1) . . . 1540($nf$-2) using a geometry-free and ionosphere-free carrier-phase combination to obtain an array 1745 of ambiguity estimates for the geometry-free and ionosphere-free carrier-phase combination and associated statistical information. The number of Quintessence filter banks is dependent on the number of carrier frequencies as discussed in United States Patent Application Publication US2005/0101248 A1. Sub-filter process 1750 applies to data set 1705 at least one code filter bank such as code filter banks 1645(1), . . . 1645($nf$) using a plurality of geometry-free code-carrier combinations to obtain an array 1755 of ambiguity estimates for the code-carrier combinations and associated statistical information for the plurality of transmitters. The number and characteristics of the code filter banks are described in United States Patent Application Publication US2005/0101248 A1. Arrays 1625, 1635, 1645 and 1655 are combined at 1760 to obtain a combined array 1765 of ambiguity estimates for all carrier phase observations and associated statistical information, as well as multipath $(MP_1^m, \ldots, MP_N^m)$ and ionosphere parameters $(I_0^m, a_\lambda^m, a_\phi^m)$. Sub-filter processes 1720, 1730, 1740, 1750 may be carried out in parallel, for example in separate threads within a processor or in separate processors, as desired to optimize considerations such as computational efficiency, processor power consumption and/or overall processing time to position fix from availability of data set 1705. Array 1765 is optionally passed to a process 1770 to compute a position 1775, e.g., by computing a float solution and/or by computing integer least squares with validation. Various position computation techniques are discussed, for example, in United States Patent Application Publication US2005/0101248 A1.

Figure 18:
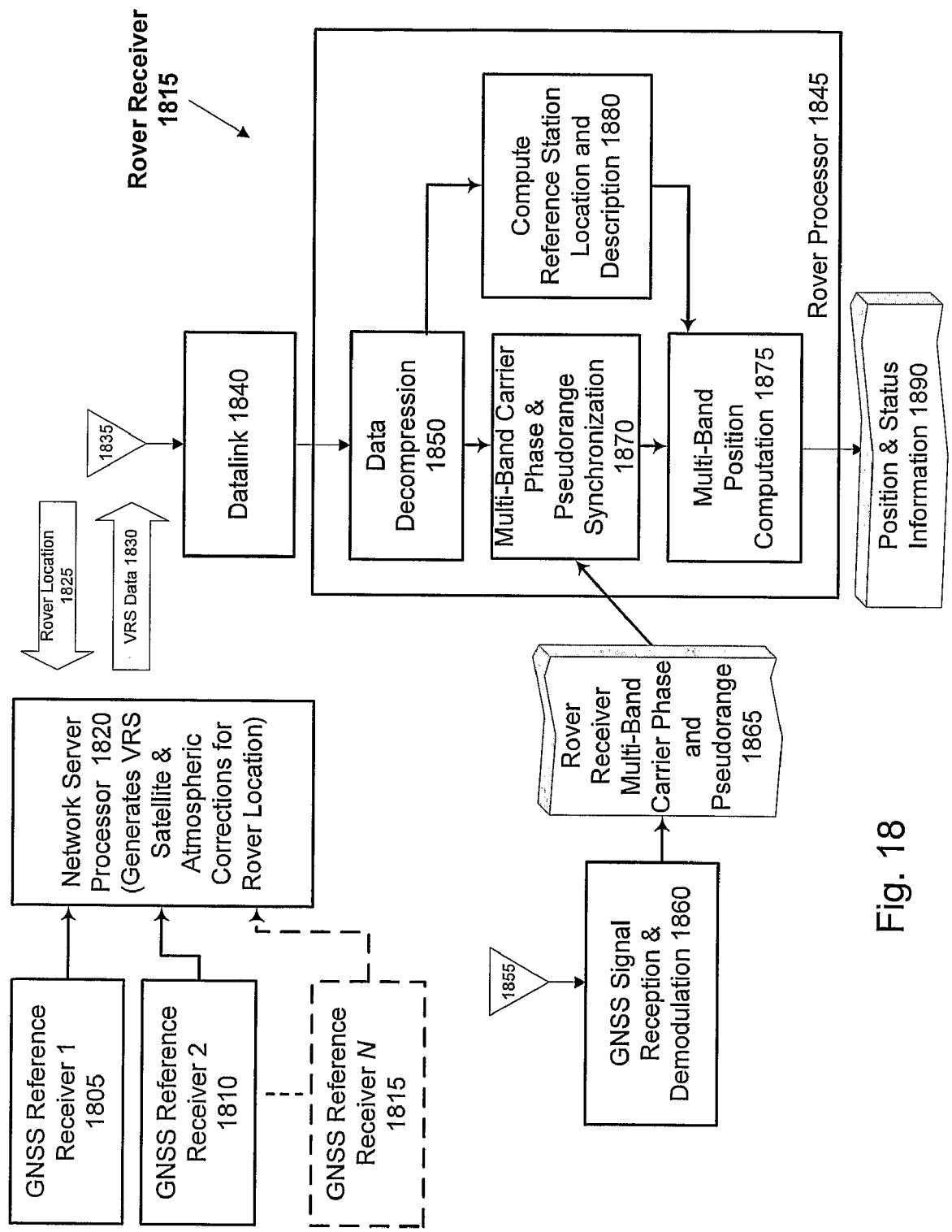
FIG. 18 schematically illustrates an application of the invention in a virtual-reference-station positioning environment.

FIG. 18 shows a mode of operation in accordance with embodiments of the invention in which a plurality of reference stations is employed in a network. Reference receivers 1805, 1810, 1815 each supply reference-station data, for example a formatted multi-band RTK data stream as described in United States Patent Application Publication US2005/0101248 A1, to a network server 1820. In the virtual-reference-station mode the reference-station data is combined by network server 1820 to produce a set of data simulating a reference station for a declared location such as the location of rover receiver 1815.

Figure 19:
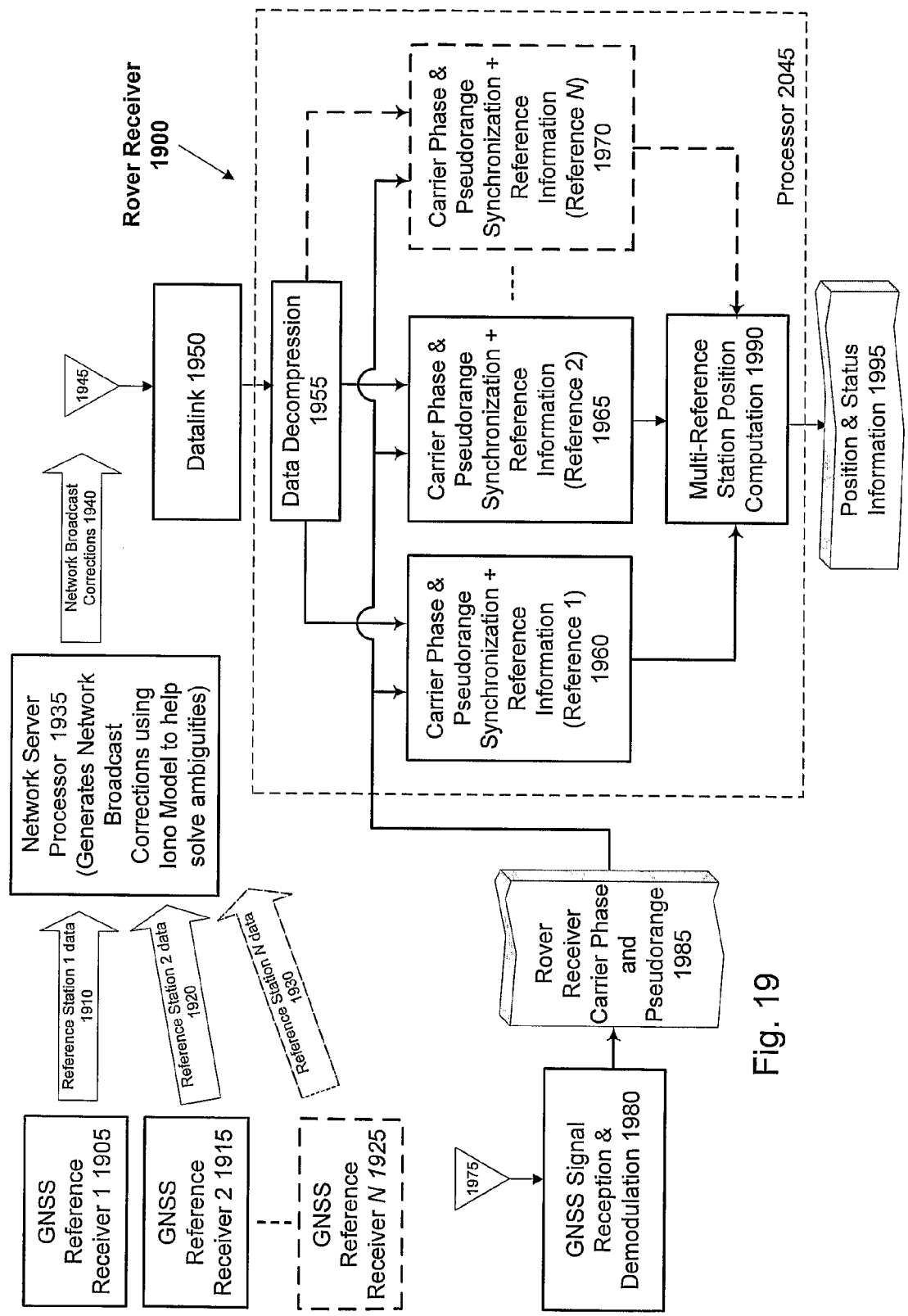
FIG. 19 schematically illustrates an application of the invention in a network broadcast corrections environment.

FIG. 19 shows a mode of operation in accordance with embodiments of the invention in which a plurality of individual reference stations is employed. Reference receivers 1905, 1915, 1925 supply respective reference station data 1910, 1920, 1930 to a network server processor 1935. The network server processor generates network broadcast corrections using the presented ion model to help solve ambiguities. The network broadcast corrections 1940 are supplied to a rover receiver 1900 which receives them through a suitable antenna 1945 and data link 1950. If the reference-station data are compressed for efficient transmission via the data link, a data decompression element 1955 within rover receiver 1900 decompresses the reference-station data for use by one or more further processing elements within processor 2045.

Rover receiver 1900 further includes an antenna 1975 for receiving GNSS signals and suitable signal reception and demodulation electronics 1980 for producing rover-receiver carrier phase and pseudorange data 1985 for use in rover processor 2045. Rover processor 2045 includes a data compression element 1955 and a multi-reference station position computation element 1990 for each of the reference stations. Computation element 1990 computes RTK position fixes of rover receiver 1900 and supplies as output data RTK position and status information 1995.

Those of ordinary skill in the art will realize that the detailed description of embodiments of the present invention is illustrative only and is not intended to be in any way limiting. Other embodiments of the present invention will readily suggest themselves to such skilled persons having the benefit of this disclosure. For example, while a minimum-error combination is employed in the examples, those of skill in the art will recognized that many combinations are possible and that a combination other than a minimum-error combination can produce acceptable if less than optimum results; thus the claims are not intended to be limited to minimum-error combinations other than where expressly called for. Reference is made in detail to implementations of the present invention as illustrated in the accompanying drawings. The same reference indicators are used throughout the drawings and the following detailed description to refer to the same or like parts.

In the interest of clarity, not all of the routine features of the implementations described herein are shown and described. It will be appreciated that in the development of any such actual implementation, numerous implementation-specific decisions must be made to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

In accordance with embodiments of the present invention, the components, process steps and/or data structures may be implemented using various types of operating systems (OS), computer platforms, firmware, computer programs, computer languages and/or general-purpose machines. The methods can be run as a programmed process running on processing circuitry. The processing circuitry can take the form of numerous combinations of processors and operating systems, or a standalone device. The processes can be implemented as instructions executed by such hardware, by hardware alone, or by any combination thereof. The software may be stored on a program storage device readable by a machine. Computational elements, such as filters and banks of filters, can be readily implemented using an object-oriented programming language such that each required filter is instantiated as needed.

Those of skill in the art will recognize that devices of a less general-purpose nature, such as hardwired devices, field programmable logic devices (FPLDs), including field programmable gate arrays (FPGAs) and complex programmable logic devices (CPLDs), application specific integrated circuits (ASICs), or the like, may also be used without departing from the scope and spirit of the inventive concepts disclosed herein.

In accordance with an embodiment of the present invention, the methods may be implemented on a data processing computer such as a personal computer, workstation computer, mainframe computer, or high-performance server running an OS such as Microsoft® Windows® XP and Windows® 2000, available from Microsoft Corporation of Redmond, Wash., or Solaris® available from Sun Microsystems, Inc. of Santa Clara, Calif., or various versions of the Unix operating system such as Linux available from a number of vendors. The methods may also be implemented on a multiple-processor system, or in a computing environment including various peripherals such as input devices, output devices, displays, pointing devices, memories, storage devices, media interfaces for transferring data to and from the processor(s), and the like. Such a computer system or computing environment may be networked locally, or over the Internet.

The invention claimed is:

1. A method of processing a set of GNSS signal data derived from signals having at least two carrier frequencies and received from two or more satellites at two or more reference stations over multiple epochs, comprising:
   a. For each satellite, forming a geometry-free combination of GNSS signal data derived from two carrier frequencies received at the reference stations during an epoch;
   b. For each satellite, applying a filter to the geometry-free combination to obtain state values representing (i) a carrier-phase ambiguity for each reference station and (ii) ionospheric advance at a reference point and state values representing variation of ionospheric advance relative to the reference point across a network area, along with error estimates for the state values; and
   c. Repeating a, and b, for each of multiple epochs to update the state values and error estimates.

2. The method of claim 1, wherein the filter of b, further obtains state values representing a multipath parameter for each reference station.

3. The method of claim 1, wherein the state values representing ionospheric advance comprise a state value representing ionospheric advance at a reference point and state values representing gradient of ionospheric advance in mutually-orthogonal directions relative to the reference point.

4. The method of claim 3, wherein the network area is defined by a region over which the reference stations are spaced apart at known locations, and wherein the reference point lies within or outside a projection of the network area on a surface representing the earth's ionosphere.

5. The method of claim 4, further comprising:
   d. Forming an ionosphere-free combination of the GNSS signal data;
   e. Applying a filter to the ionosphere-free geometric combination to obtain state values representing carrier-phase integer ambiguity estimates for the ionosphere-free carrier-phase combination and associated statistical information; and f. Combining the state values and associated statistical information of b, and e, to determine ambiguity estimates for all carrier phase observations and associated statistical information.

6. The method of claim 1, further comprising:
   d. Forming an ionosphere-free geometric combination of the GNSS signal data;
   e. Applying a filter to the ionosphere-free combination to obtain state values representing carrier-phase integer ambiguity estimates for the ionosphere-free carrier-phase combination and associated statistical information;
   f. Applying at least one code filter to the GNSS signal data using a plurality of geometry-free code-carrier combinations to obtain ambiguity estimates for the code-carrier combinations and associated statistical information; and
   g. Combining the state values and associated statistical information of b, e, and f, to determine ambiguity estimates for all carrier phase observations and associated statistical information.

7. The method of claim 1, wherein the GNSS signal data is derived from at least three carrier frequencies received at the reference stations over multiple epochs, further comprising:
   d. Forming an ionosphere-free combination of the GNSS signal data;
   e. Applying a filter to the ionosphere-free combination to obtain state values representing carrier-phase integer ambiguity estimates for the ionosphere-free carrier-phase combination and associated statistical information;
   f. Applying at least one code filter to the GNSS signal data using a plurality of geometry-free code-carrier combinations to obtain ambiguity estimates for the code-carrier combinations and associated statistical information;
   g. Applying at least one quintessence filter to the GNSS signal data using a plurality of geometry-free and ionosphere-free carrier-phase combinations to obtain ambiguity estimates for the geometry-free and ionosphere-free carrier-phase combinations and associated statistical information; and
   h. Combining the state values and associated statistical information of b, e, i, and j, to determine ambiguity estimates for all carrier phase observations and associated statistical information.

8. The method of claim 5, further comprising: computing from the ambiguity estimates for all carrier phase observations a set of errors at the reference stations, generating from the set of errors at the reference stations a set of virtual-reference-station data for use by a GNSS receiver at the mobile GNSS receiver location, and transmitting the set of virtual-reference-station data for use by a GNSS receiver at the mobile GNSS receiver location.

9. The method of claim 5, further comprising: combining the ambiguity estimates for all carrier phase observations with the set of GNSS signal data to produce a set of network broadcast data for use by GNSS receivers within the network area, and transmitting the network broadcast data for use by GNSS receivers within the network area.

10. Apparatus for processing a set of GNSS signal data derived from signals having at least two carrier frequencies and received from two or more satellites at two or more reference stations over multiple epochs, comprising:
    a. A processing element to prepare a geometry-free combination of GNSS signal data derived from two carrier frequencies received at the reference stations during an epoch; and
    b. For each satellite, a filter to obtain from the geometry-free combination state values representing (i) a carrier-phase ambiguity for each reference station and (ii) ionospheric advance at a reference point and variation of ionospheric advance relative to the reference point across a network area, along with error estimates for the state values,
    wherein the processing element a, and the filter b, are operative over each of multiple epochs to update the state values and error estimates.

11. The apparatus of claim 10, wherein the filter further obtains state values representing a multipath parameter for each reference station.

12. The apparatus of claim 10, wherein the state values representing ionospheric advance comprise a state value representing ionospheric advance at a reference point and state values representing gradient of ionospheric advance in mutually-orthogonal directions relative to the reference point.

13. The apparatus of claim 10, wherein the network area is defined by a region over which the reference stations are spaced apart at known locations, and wherein the reference point lies within or outside a projection of the network area on a surface representing the earth's ionosphere.

14. The apparatus of claim 10, further comprising:
    c. A processing element to prepare an ionosphere-free combination of the GNSS signal data;
    d. A filter to obtain from the ionosphere-free geometric combination state values representing carrier-phase integer ambiguity estimates for the ionosphere-free carrier-phase combination and associated statistical information; and
    e. A combiner to determine ambiguity estimates for all carrier phase observations and associated statistical information by combining the state values and associated statistical information obtained by filters b, with the state values and associated statistical information obtained by filter d.

15. The apparatus of claim 10, further comprising:
    c. A processing element to prepare an ionosphere-free combination of the GNSS signal data;
    d. A filter to obtain from the ionosphere-free geometric combination state values representing carrier-phase integer ambiguity estimates for the ionosphere-free carrier-phase combination and associated statistical information;
    e. At least one code filter to using a plurality of geometry-free code-carrier combinations of the GNSS signal data to obtain ambiguity estimates for the code-carrier combinations and associated statistical information; and
    f. A combiner to determine ambiguity estimates for all carrier phase observations and associated statistical information by combining the state values and associated statistical information obtained by filters b, with the state values and associated statistical information obtained by filter d, and with the ambiguity estimates and associated statistical information obtained by at least one code filter.

16. The apparatus of claim 10, wherein the GNSS signal data is derived from at least three carrier frequencies received at the reference stations over multiple epochs, further comprising:
    c. A processing element to prepare an ionosphere-free geometric combination of the GNSS signal data;
    d. A filter to obtain from the ionosphere-free combination state values representing carrier-phase integer ambiguity estimates for the ionosphere-free carrier-phase combination and associated statistical information;

e. At least one code filter to using a plurality of geometry-free code-carrier combinations of the GNSS signal data to obtain ambiguity estimates for the code-carrier combinations and associated statistical information;

f. At least one quintessence filter using a plurality of geometry-free and ionosphere-free carrier-phase combinations of the GNSS signal data to obtain ambiguity estimates for geometry-free and ionosphere-free carrier-phase combinations and associated statistical information; and g. A combiner to determine ambiguity estimates for all carrier phase observations and associated statistical information by combining the state values and associated statistical information obtained by filters b, with the state values and associated statistical information obtained by filter d, and with the ambiguity estimates and associated statistical information obtained by the at least one code filter and with the ambiguity estimates and associated statistical information obtain by the at least one quintessence filter.

17. The apparatus of claim 14, further comprising: a resolver to compute from the ambiguity estimates for all carrier phase observations a set of errors at the reference stations, generating from the set of errors at the reference stations a set of virtual-reference-station data for use by a GNSS receiver at the mobile GNSS receiver location, and transmitting the set of virtual-reference-station data for use by a GNSS receiver at the mobile GNSS receiver location.

18. The apparatus of claim 14, further comprising: a combining element to combine the ambiguity estimates for all carrier phase observations with the set of GNSS signal data to produce a set of network broadcast data for use by GNSS receivers within the network area, and transmitting the network broadcast data for use by GNSS receivers within the network area.

19. A network correction data stream prepared by processing a set of GNSS signal data derived from signals having at least two carrier frequencies and received from two or more satellites at two or more reference stations over multiple epochs, wherein the data stream is prepared by:

a. For each satellite, forming a geometry-free combination of GNSS signal data derived from two carrier frequencies received at the reference stations during an epoch;

b. For each satellite, applying a filter to the geometry-free combination to obtain state values representing (i) a carrier-phase integer ambiguity for each reference station and (ii) ionospheric advance at a reference point and variation of ionospheric advance relative to the reference point across a network area, along with error estimates for the state values;

c. Repeating a, and b, for each of multiple epochs to update the state values and error estimates;

d. Combining the ambiguity estimates for all carrier phase observations with the set of GNSS signal data to produce a set of network broadcast data for use by GNSS receivers within the network area, and transmitting the network broadcast data for use by GNSS receivers within the network area.

20. A network correction data stream prepared by processing a set of GNSS signal data derived from signals having at least two carrier frequencies and received from two or more satellites at two or more reference stations over multiple epochs, wherein the data stream is prepared by:

a. For each satellite, forming a geometry-free combination of GNSS signal data derived from two carrier frequencies received at the reference stations during an epoch;

b. For each satellite, applying a filter to the geometry-free combination to obtain state values representing (i) a carrier-phase integer ambiguity for each reference station and (ii) ionospheric advance at a reference point and variation of ionospheric advance relative to the reference point across a network area, along with error estimates for the state values;

c. Repeating a, and b, for each of multiple epochs to update the state values and error estimates;

d. Forming an ionosphere-free combination of the GNSS signal data;

e. Applying a filter to the ionosphere-free geometric combination to obtain state values representing carrier-phase integer ambiguity estimates for the ionosphere-free carrier-phase combination and associated statistical information;

f. Combining the state values and associated statistical information of b, and e, to determine ambiguity estimates for all carrier phase observations and associated statistical information; and g. Combining the ambiguity estimates for all carrier phase observations with the set of GNSS signal data to produce a set of network broadcast data for use by GNSS receivers within the network area, and transmitting the network broadcast data for use by GNSS receivers within the network area.

21. A network correction data stream prepared by processing a set of GNSS signal data derived from signals having at least two carrier frequencies and received from two or more satellites at two or more reference stations over multiple epochs, wherein the data stream is prepared by:

a. For each satellite, forming a geometry-free combination of GNSS signal data derived from two carrier frequencies received at the reference stations during an epoch;

b. For each satellite, applying a filter to the geometry-free combination to obtain state values representing (i) a carrier-phase integer ambiguity for each reference station and (ii) ionospheric advance at a reference point and variation of ionospheric advance relative to the reference point across a network area, along with error estimates for the state values;

c. Repeating a, and b, for each of multiple epochs to update the state values and error estimates;

d. Forming an ionosphere-free geometric combination of the GNSS signal data;

e. Applying a filter to the ionosphere-free combination to obtain state values representing carrier-phase integer ambiguity estimates for the ionosphere-free carrier-phase combination and associated statistical information;

f. Applying at least one code filter to the GNSS signal data using a plurality of geometry-free code-carrier combinations to obtain ambiguity estimates for the code-carrier combinations and associated statistical information;

g. Combining the state values and associated statistical information of b, e, and f, to determine ambiguity estimates for all carrier phase observations and associated statistical information; and h. Combining the ambiguity estimates for all carrier phase observations with the set of GNSS signal data to produce a set of network broadcast data for use by GNSS receivers within the network area, and transmitting the network broadcast data for use by GNSS receivers within the network area.

22. A network correction data stream prepared by processing a set of GNSS signal data derived from signals having at least three carrier frequencies and received from two or more satellites at two or more reference stations over multiple epochs, wherein the data stream is prepared by:

a. For each satellite, forming a geometry-free combination of GNSS signal data derived from two carrier frequencies received at the reference stations during an epoch;

b. For each satellite, applying a filter to the geometry-free combination to obtain state values representing (i) a carrier-phase integer ambiguity for each reference station and (ii) ionospheric advance at a reference point and variation of ionospheric advance relative to the reference point across a network area, along with error estimates for the state values;

c. Repeating a, and b, for each of multiple epochs to update the state values and error estimates;

d. Forming an ionosphere-free geometric combination of the GNSS signal data;

e. Applying a filter to the ionosphere-free geometric combination to obtain state values representing carrier-phase integer ambiguity estimates for the ionosphere-free carrier-phase combination and associated statistical information;

f. Applying at least one code filter to the GNSS signal data using a plurality of geometry-free code-carrier combinations to obtain ambiguity estimates for the code-carrier combinations and associated statistical information;

g. Applying at least one quintessence filter to the GNSS signal data using a plurality of geometry-free and ionosphere-free carrier-phase combinations to obtain ambiguity estimates for the geometry-free and ionosphere-free carrier-phase combinations and associated statistical information;

h. Combining the state values and associated statistical information of b, e, f, and g, to determine ambiguity estimates for all carrier phase observations and associated statistical information; and i. Combining the ambiguity estimates for all carrier phase observations with the set of GNSS signal data to produce a set of network broadcast data for use by GNSS receivers within the network area, and transmitting the network broadcast data for use by GNSS receivers within the network area.

* * * * *